(12) United States Patent
Kuwajima et al.

(10) Patent No.: US 9,773,516 B2
(45) Date of Patent: Sep. 26, 2017

(54) HEAD ASSEMBLY AND MAGNETIC DISK DEVICE

(71) Applicant: TDK CORPORATION, Tokyo (JP)

(72) Inventors: Hideki Kuwajima, Tokyo (JP); Taku Someya, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 15/068,941

(22) Filed: Mar. 14, 2016

(65) Prior Publication Data

US 2016/0267928 A1  Sep. 15, 2016

(30) Foreign Application Priority Data

Mar. 13, 2015  (JP) .................................. 2015-050233
Dec. 21, 2015  (JP) .................................. 2015-248121

(51) Int. Cl.
*G11B 21/21*  (2006.01)
*G11B 5/48*  (2006.01)

(52) U.S. Cl.
CPC ............ *G11B 5/4826* (2013.01); *G11B 5/484* (2013.01)

(58) Field of Classification Search
None
See application file for complete search history.

(56) References Cited

U.S. PATENT DOCUMENTS

| 5,936,803 | A * | 8/1999 | Berding | G11B 5/56 360/244.8 |
| 7,907,368 | B2 * | 3/2011 | Zeng | G11B 5/4826 360/245.1 |
| 8,027,127 | B2 * | 9/2011 | Zeng | G11B 5/4826 360/245 |
| 8,107,198 | B1 * | 1/2012 | Ee | G11B 5/4826 360/245.3 |
| 8,169,745 | B2 * | 5/2012 | Yao | G11B 5/4813 360/245 |
| 8,780,501 | B2 | 7/2014 | Kuwajima | |
| 8,797,690 | B2 * | 8/2014 | Tao | G11B 5/4826 360/234.6 |
| 9,093,092 | B1 * | 7/2015 | Zhang | G11B 5/483 |
| 2010/0061020 | A1 | 3/2010 | Maslov et al. | |

(Continued)

FOREIGN PATENT DOCUMENTS

| JP | S63-306575 A | 12/1988 |
| JP | H02-227886 A | 9/1990 |

(Continued)

*Primary Examiner* — Will J Klimowicz

(74) *Attorney, Agent, or Firm* — Oliff PLC

(57) ABSTRACT

To control the resonance generated in the head assembly and improve property on the head location controlling. A head assembly includes: a slider having a head element; a slider supporting plate for holding the slider; a load beam for holding the slider supporting plate; a support projection which is arranged on the front end part of the load beam and on which the slider supporting plate is supported rotatably; a drive unit that rotates the slider supporting plate around the support projection; a dynamic vibration absorber arranged on the slider supporting plate, wherein the dynamic vibration absorber is disposed closer to the rear end side of the load beam than the support projection and has vibration freedom in the rotating direction of the slide supporting plate.

17 Claims, 34 Drawing Sheets

(56) References Cited

U.S. PATENT DOCUMENTS

2012/0287536 A1 11/2012 Kuwajima
2014/0168813 A1* 6/2014 Tao ..................... G11B 5/4826
                                                             360/75

FOREIGN PATENT DOCUMENTS

| JP | 2010-061784 A | 3/2010 |
| JP | 5360129 B2 | 12/2013 |

* cited by examiner

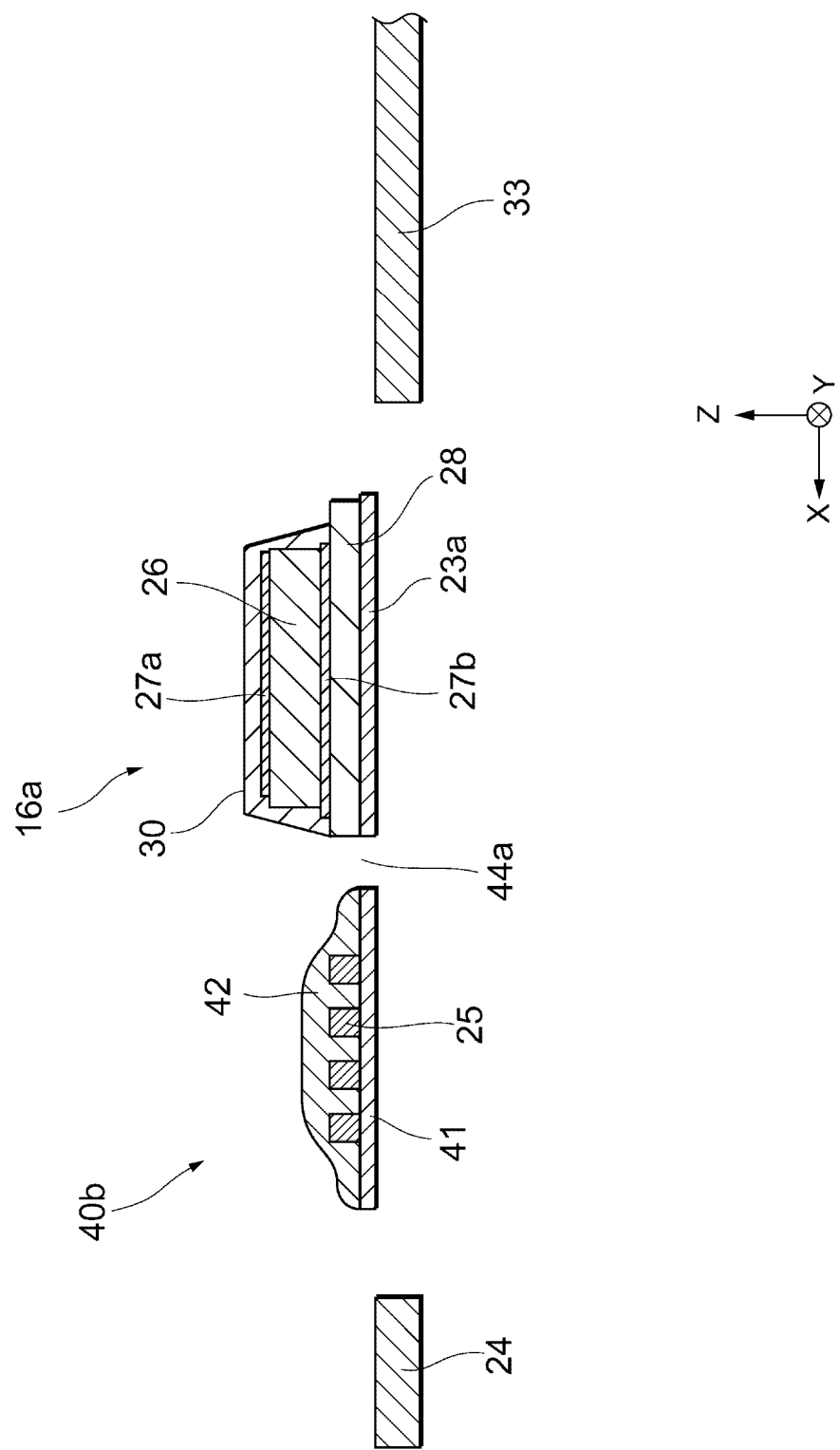

HEAD ASSEMBLY AND MAGNETIC DISK DEVICE

The present invention relates to a head assembly of a hard-disk drive and also a magnetic disk device, wherein the head assembly is provided with a mechanism for precisely locating the head.

BACKGROUND

In recent years, the recording density of a magnetic disk disposed in a magnetic disk device is gradually developed to be higher. A head supporting mechanism is proposed in Patent Document 1, wherein a piezoelectric element drives the head supporting spring mechanism at a micro scale so as to locate the head on the recording track with high precision.

In addition, Patent Document 2 has proposed a configuration in which the slider rotates around the support projection disposed on a load beam, and the inertia axis of the rotating part which contains the slider almost coincides with the support projection.

However, in the configuration described in Patent Document 1, the reaction force generated when the slider is shifted at a micro scale by a pair of shifting unit induces the head supporting spring to resonate. Thus, there are problems. For example, the control band cannot be widened due to the resonance when the head element is located in a high speed.

Further, with respect to the configuration described in Patent Document 2, when the slider is driven by being rotated around the support projection of the load beam, there is a rotating mode involving the Yaw direction of the slider. In the future, in order to further extend the control band with which the head is located, it is necessary to set the resonance at a higher frequency in the yawing mode of the slider.

PATENT DOCUMENTS

Patent Document 1: JP-A-H2-227886
Patent Document 2: JP-P5360129

SUMMARY

In the conventional configurations, when the head element is located on the recording track of the disk, the operating frequency of the actuator will induce the resonance frequency of the head supporting mechanism so that the head supporting mechanism generates unnecessary vibrations. In this respect, there are several problems for the conventional configurations. For instance, in order to avoid influence of resonance only low control bands can be adopted.

The present invention is made in view of the conditions mentioned above. It aims to suppress the resonance generated in the head assembly and improve property on the head location controlling.

The head assembly of the present invention is characterized in that it is provided with the following parts: a slider having a head element; a slider supporting plate for holding the slider; a load beam for holding the slider supporting plate; a support projection which is arranged on the front end part of the load beam and on which the slider supporting plate is supported rotatably; a drive unit that rotates the slider supporting plate around the support projection; a dynamic vibration absorber arranged on the slider supporting plate, wherein the dynamic vibration absorber is disposed at a position closer to the rear end side of the load beam than the support projection and has vibration freedom relative to the rotating direction of the slide supporting plate.

According to the present invention, since the dynamic vibration absorber disposed on the slider supporting plate is closer to the rear end side of the load beam than the support projection and has vibration freedom relative to the rotating direction of the slider supporting plate, the resonance peak value of the load beam in Sway mode can be suppressed and the rotating vibration of the slider in the Yaw direction can be prevented at the anti-resonance frequency of the dynamic vibration absorber. As such, the property of head location controlling can be improved and the weight part itself can be downsized so as to provide a lighter weight.

Preferably, the dynamic vibration absorber may be provided with a weight part, a spring part for connecting the weight part to the slider supporting plate, and a damping part for eliminating the vibration amplitude of the weight part relative to the slider supporting plate. Thus, the damping property is provided to the operations of the dynamic vibration absorber. Also, a stable property can be provided.

Preferably, the weight part has a first resonance point at which the weight part resonates by the vibration in the same direction as the direction in which the head element of the slider rotates relative to the support projection. The first resonance point is at a frequency higher than the resonance frequency of the load beam in Sway mode. As such, Sway mode of the load beam can be prevented.

Preferably, the weight part, the spring part and the damping part can be arranged by etching the lamination material for flexure. In this way, the dynamic vibration absorber can be easily disposed on the slider supporting plate with a low cost.

It is preferable that the weight part has a mass adjustment part. In this respect, the anti-resonance frequency of the dynamic vibration absorber can be adjusted precisely to a frequency that should be suppressed.

The magnetic disk device of the present invention is characterized in that it is provided with the head assembly mentioned above. According to the present invention, a magnetic disk device can be provided in which the resonance generated in the head assembly is suppressed and the property of head location controlling can be improved.

The present invention is capable of suppressing the resonance generated in the head assembly and also improving the property of head location controlling. Further, the location precision of the head element with respect to the recording track can be improved in a low cost without adding new processing steps.

BRIEF DESCRIPTION OF THE DRAWINGS

FIG. 5b is a cross-sectional view taken along A-A line in FIG. 5a.

FIG. 5c is a cross-sectional view taken along B-B line in FIG. 5a.

FIG. 8e is a cross-sectional view taken along H-H line in FIG. 6.

DETAILED DESCRIPTION OF EMBODIMENTS

Hereinafter, the preferable embodiments of the present invention will be described with reference to the drawings. Further, the present invention is not limited to the following embodiments. The structural element described below includes those easily thought of by those skilled in the art and those substantially the same with the described ones. In addition, the structural elements described below can be used in combination. Further, it is possible to omit or replace or change some structural elements without departing from the spirit and scope of the present invention.

Figure 1:
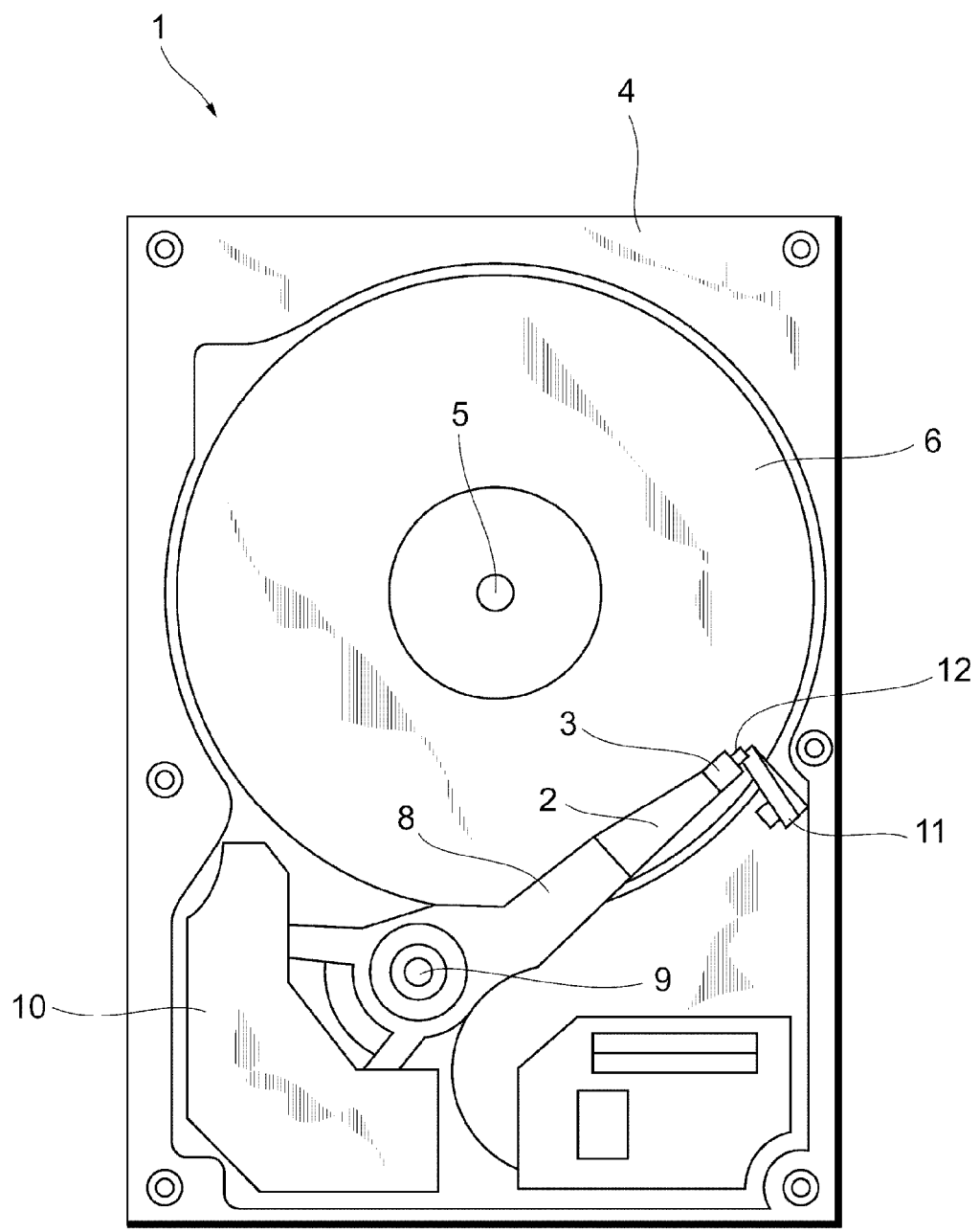
FIG. 1 is a schematic plan view showing the magnetic disk device provided with the head assembly according to a preferable embodiment of the present invention.

FIG. 1 is a schematic view showing the entire configuration of the magnetic disk device (HDD device) in the loading/unloading manner, which is provided with the head assembly according to a preferable embodiment of the present invention. According to FIG. 1, magnetic disk device 1 consists of housing 4, magnetic disk 6 being driven by a spindle motor to rotate around axis 5, head assembly 2 provided with slider 3 at its front end part, and supporting arm 8 for supporting the head assembly 2 at the front end part, wherein slider 3 contains head element 7.

A coil part of a voice coil motor (VCM) is arranged at the rear end part of supporting arm 8. Supporting arm 8 can rotate around horizontal rotating axis 9 in parallel to the surface of magnetic disk 6. The VCM is composed of the coil part (no shown) and magnet part 10 which covers the coil part. Ramp mechanism 11 is arranged from the outside of the data region of magnetic disk 6 to the outside of magnetic disk 6, tab 12 disposed at the forefront of head assembly 2 is run upon its inclined surface so as to separate slider 3 from magnetic disk 6 to provide the unloading state.

During the operation (rotation of disk in a high speed) of magnetic disk device 1, slider 3 floats over the surface of the magnetic disk 6 with a minor gap therebetween and is thus in the loading state. On the other hand, when magnetic disk device 1 is not being operated (the disk stays still or rotates in a low speed when it is to be started or stopped), tab 12 at the forefront of head assembly 2 is lifted on ramp mechanism 11 and thus slider 3 is in the unloading state.

Figure 2:
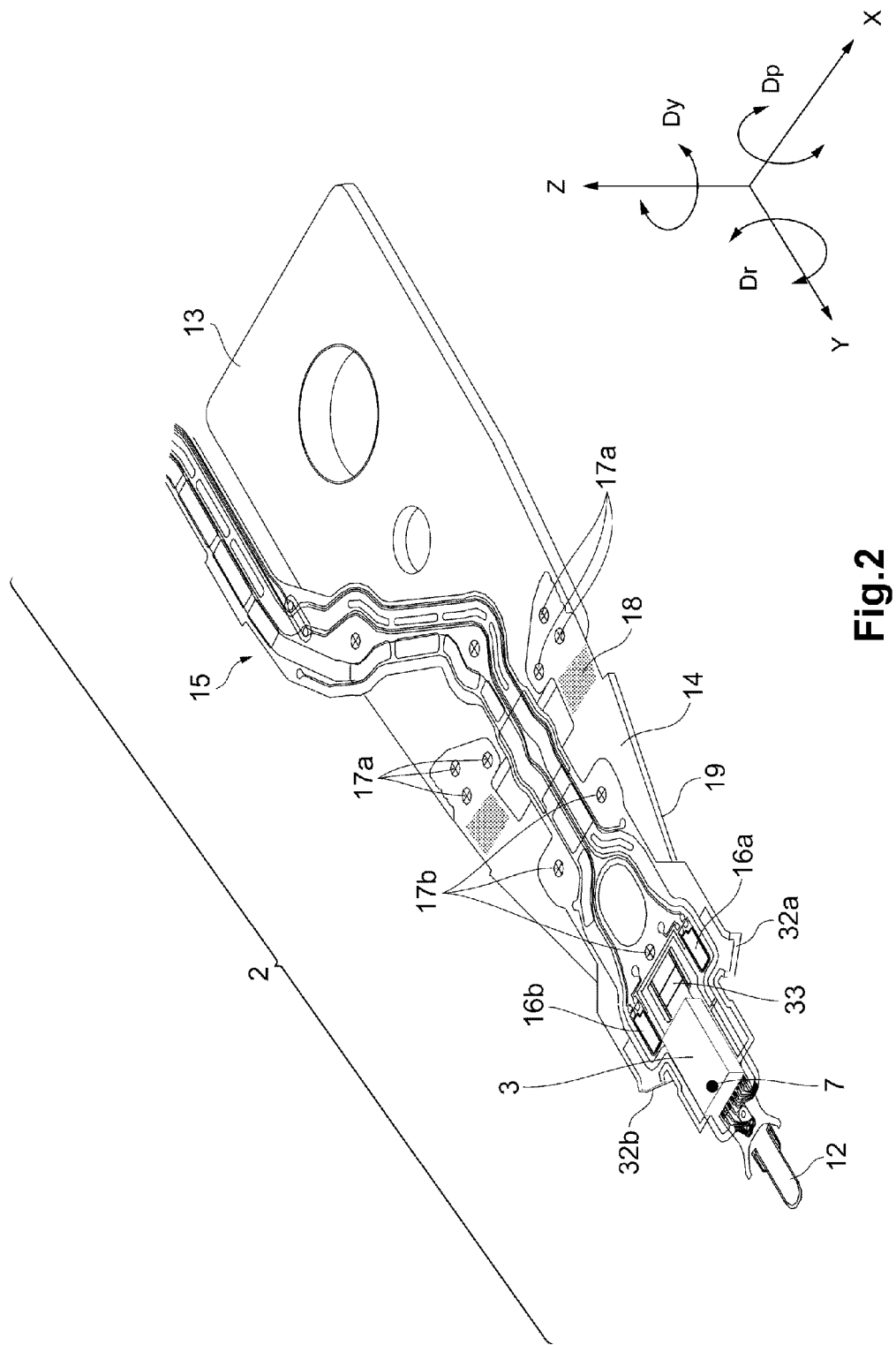
FIG. 2 is a perspective view showing the head assembly according to a preferable embodiment of the present invention.

FIG. 2 is a perspective view schematically showing the entire configuration of the head assembly according to a preferable embodiment of the present invention. Hereinafter, for the convenience of description, the positive direction of Z axis as shown in the drawings is referred to the upper side of head assembly 2, and the negative direction of Z axis is referred to as rear side or lower side of head assembly 2. Slider 3 has head element 7 at its rear end plane (trailing edge, at the positive direction of Y axis), and head element 7 consists of a inductive recording head element, and a MR (magneto resistance) reading thin film head such as a reading head element with giant magneto resistance (GMR) or a reading head element with tunneling magneto resistance (TMR).

In FIG. 2, head assembly 2 is provided with base plate 13, load beam 14, flexure 15, first drive unit 16*a* (i.e., the first thin film piezoelectric element) and second drive unit 16*b* (i.e., the second thin film piezoelectric element) and slider 3 as the main structural elements. In addition, dynamic vibration absorber 33 is disposed on flexure 15. And base plate 13 is arranged on the front end part of supporting arm 8.

Load beam 14 is fixed to base plate 13 via several beam welding points 17*a*. In addition, blade spring 18 is formed on lead beam 14 and provides slider 3 with a specified push against the magnetic disk. Load beam 14 disposes bending processing parts 19 at both sides to enhance the strength. The wiring board, i.e., flexure 15 is fixed to load beam 14 via beam welding points 17*b*. In FIG. 2, with respect to the attitude angles of slider 3, Dp represents the pitch direction, and Dr and Dy represent the roll direction and Yaw direction, respectively. Base plate 13 or load beam 14 is axisymmetrical relative to the central axis which is parallel to Y axis in each figure.

Figure 3:
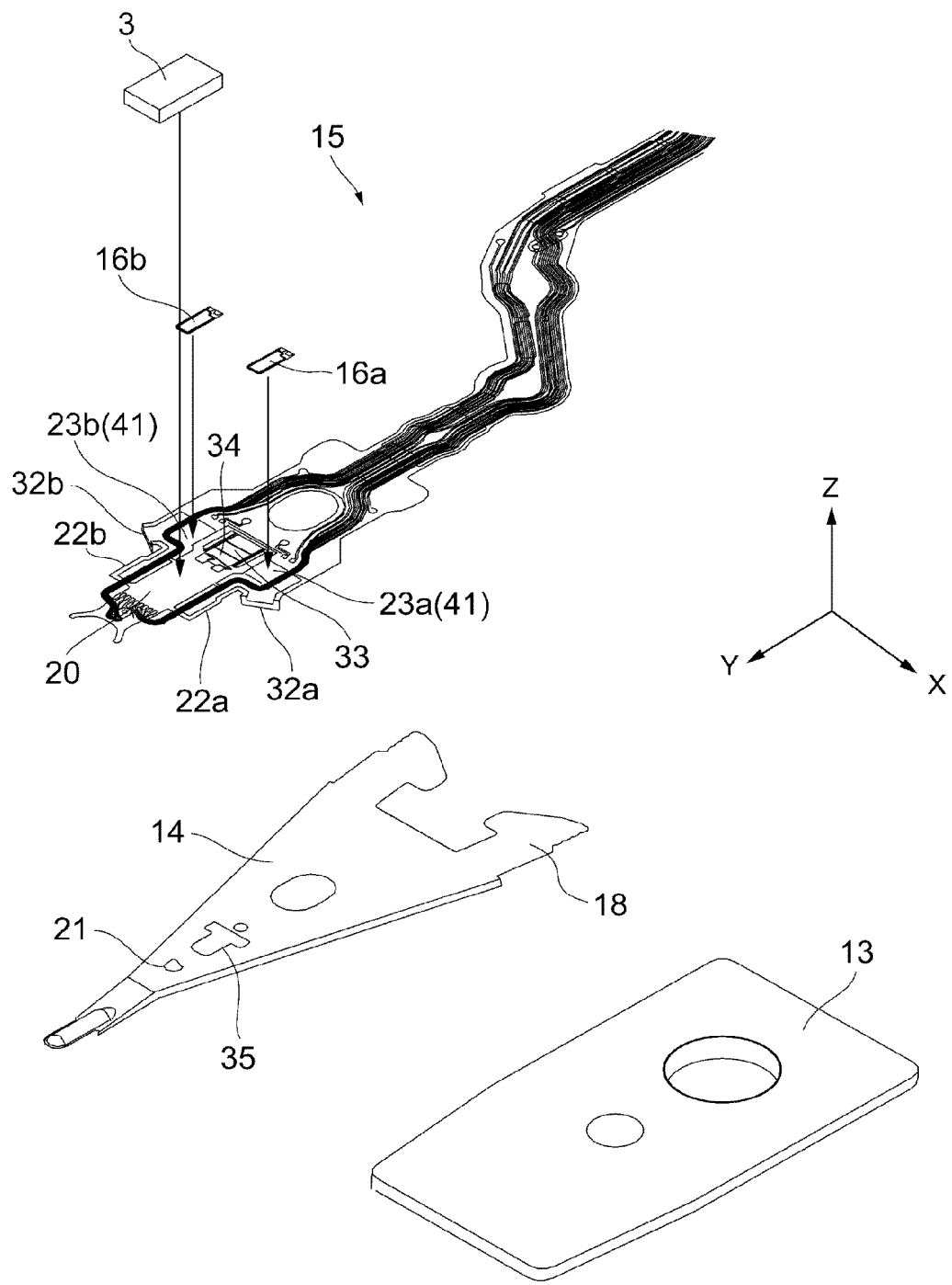
FIG. 3 is an exploded perspective view showing the head assembly according to a preferable embodiment of the present invention.

FIG. 3 is an exploded perspective view schematically showing the head assembly according to a preferable embodiment of the present invention. That is, in FIG. 3, head assembly 2 is dismantled into load beam 14, flexure 15, base plate 13, first and second drive unit 16*a* and 16*b* and slider 3. Generally speaking, flexure 15 is a wiring board obtained by an insulating layer being coated on a thin stainless steel plate (i.e., flexure board 24) of about 18 μm in thickness and a copper foil being plated on the insulating layer. The stainless steel plate, the insulating layer and the copper foil are etched in optional shapes and then accurately machined in specific shapes.

As shown in FIG. 3, slider 3 is bonded and fixed to slider supporting plate 20 which is disposed on flexure 15. Support projection 21 is integratedly projected and formed on the central line near the front end part of load beam 14. Slider supporting plate 20 is supported by first outrigger 22*a* and second outrigger 22*b*, and its rear plane contacts with the central position of the slider at a point and slider supporting plate 20 is supported on support projection 21 in such a manner that it can rotate in a free style. Thus, slider supporting plate 20 is supported by load beam 14 with a pivot structure. In addition, first and second outriggers 22*a* and 22*b* flexibly keep the posture of slider 3. In this respect, slider 3 smoothly tracks the disk as its posture changes in response to the fluctuation on the disk surface. In another respect, the push generated by blade spring 18 on load beam 14 acts between support projection 21 and slider supporting plate 20. Thus, slider supporting plate 20 is in such a state that it is held in X direction and Y direction through the friction induced by the push.

First drive unit 16*a* and second drive unit 16*b* are bonded on first piezoelectric supporting part 23*a* and second piezoelectric supporting part 23*b* of flexure 15. First drive unit 16*a* and second drive unit 16*b* expand and contract alternatively and provide slider supporting plate 20 with the rotating force in Yaw direction along the plane so as to rotate slide supporting plate 20 around support projection 21. Further, first piezoelectric supporting part 23*a* and second piezoelectric supporting part 23*b* are formed by insulating layer 41, wherein insulating layer 41 forms flexure 15. Dynamic vibration absorber 33 is disposed on slider supporting plate 20, and it is closer to the rear end side of the load beam than support projection 21.

Figure 4:
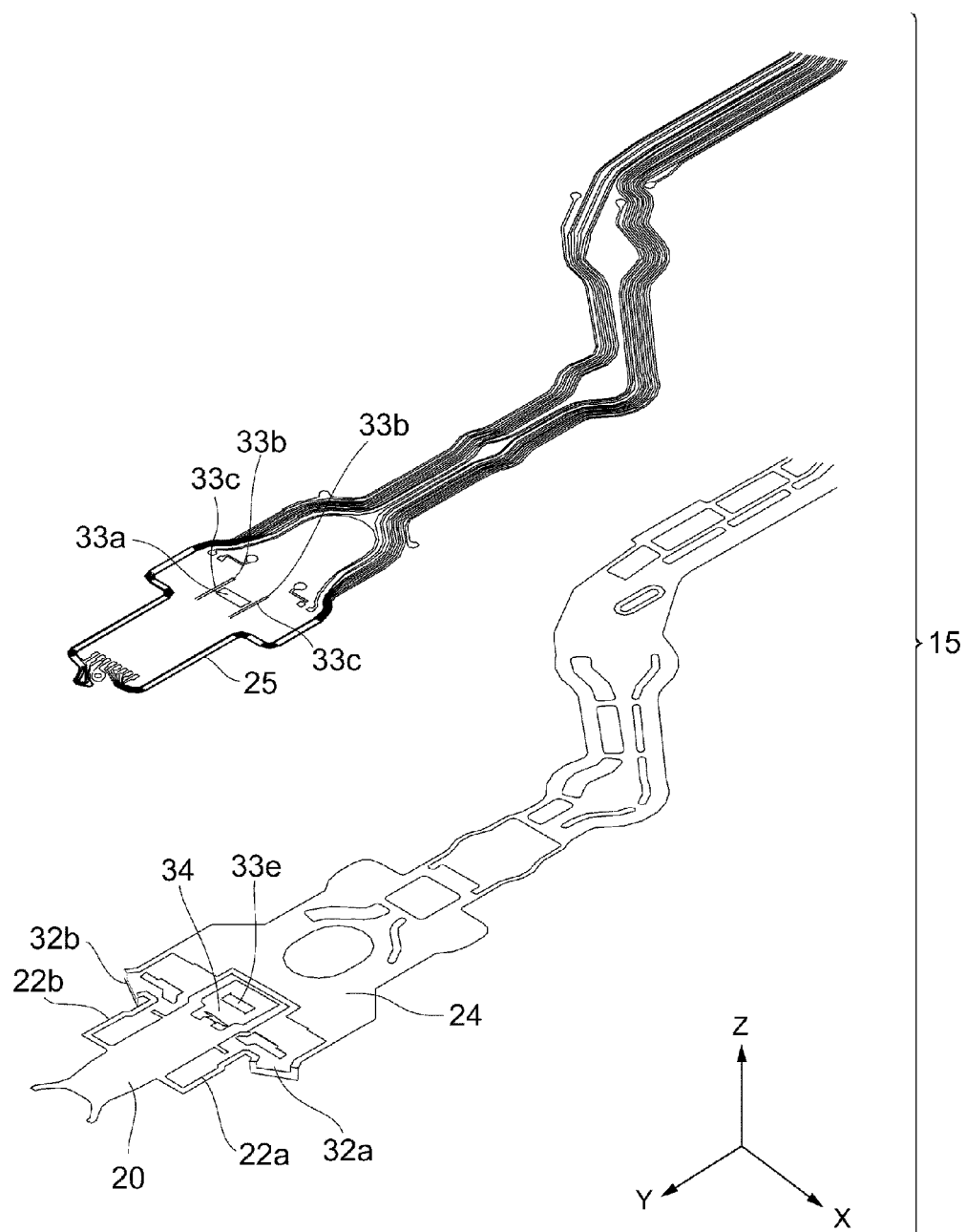
FIG. 4 is an exploded perspective view showing the flexure provided in the head assembly according to a preferable embodiment of the present invention.

FIG. 4 is an exploded perspective view showing the configuration of the flexure provided in the head assembly according to a preferable embodiment of the present invention. In FIG. 4, the flexure is integratedly formed. However, for better understanding, flexure board 24 and head element wiring 25 (wiring part) are separated. Dynamic vibration absorber 33 is composed of first weight part 33*a*, second weight part 33*e*, spring part 33*b* and damping part 33*c*, and is arranged by etching the lamination material for the flexure. In particular, first weigh part 33*a* and spring part 33*b* in dynamic vibration absorber 33 are made of the copper foil which is the same as that in head element wiring 25. In addition, damping part 33*c* is made of insulating layer 41 of polyimide. Second weight part 33*e* in dynamic vibration absorber 33 is formed by performing etching in flexure board 24. Further, the wiring material of copper foil is exposed on the upper surface of first weight part 33*a* so as to add the mass of a solder ball or the like (mass adjustment part) to this surface.

Figure 5A:
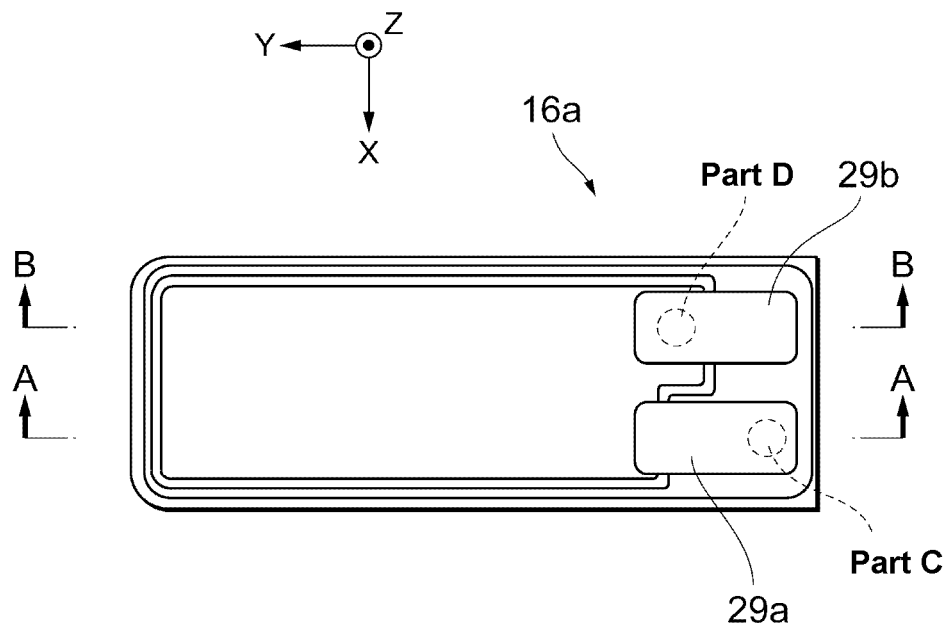
FIG. 5a is a plan view showing the first drive unit provided in the head assembly according to a preferable embodiment of the present invention.
Figure 5B:
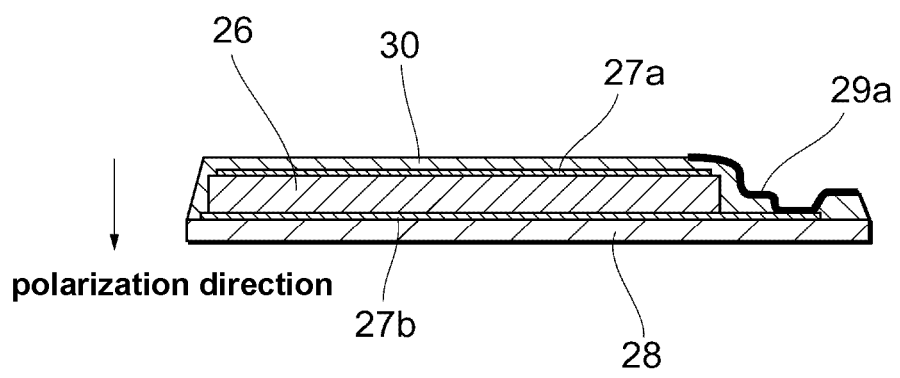
Figure 5C:
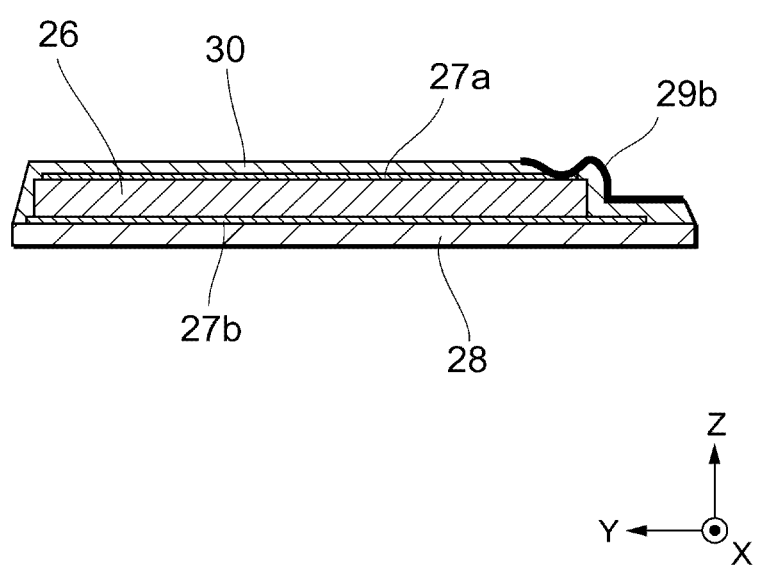

FIG. 5*a* is a plan view showing the first drive unit provided in the head assembly according to a preferable embodiment of the present invention. In addition, FIG. 5*b* shows the cross-section taken along A-A line in FIG. 5*a*, and FIG. 5*c* shows the cross-section taken along B-B line in FIG. 5*a*. Since first drive unit 16*a* and second drive unit 16*b* have the same configuration, only the configuration of first drive unit 16*a* is shown here. Upper electrode 27*a* is formed on the upper side of thin film piezoelectric 26, and lower electrode 27*b* is formed on the lower side of thin film piezoelectric 26. As first drive unit 16*a* is very thin and easy to break, base 28 which is a soft strengthening material is arranged.

In order to protect thin film piezoelectric 26, first drive unit 16*a* is totally covered with insulating cover 30 made of polyimide. In addition, part of insulating cover 30 is removed at part C and part D as shown in FIG. 5*a*. At part C, lower electrode 27*b* is exposed and connected with first electrode pad 29*a*. Similarly, at part D, upper electrode 27*a* exposes and connects with second electrode pad 29*b*. In this way, when the voltage is applied to first electrode pad 29*a* and second electrode pad 29*b*, thin film piezoelectric 26 in first drive unit 16*a* can expand and contract. In FIG. 5*b*, the arrow shows the polarization direction of thin film piezoelectric 26. If an electric field is applied in the polarization direction (a negative voltage is applied to first electrode pad 29a and a positive voltage is applied to second electrode pad 29b), thin film piezoelectric 26 will contract in the in-plane direction of the piezoelectric thin film with a piezoelectric constant d31. If an electrical field is applied in a direction opposite to the polarization direction, thin film piezoelectric 26 will expand. On the other hand, if a negative voltage is applied to third electrode pad 29c (which corresponds to first electrode pad 29a) and a positive voltage is applied to fourth electrode pad 29d (which corresponds to second electrode pad 29b), thin film piezoelectric 26 in second drive unit 16b will contract in the in-plane direction of the piezoelectric thin film with a piezoelectric constant d31.

Figure 6:
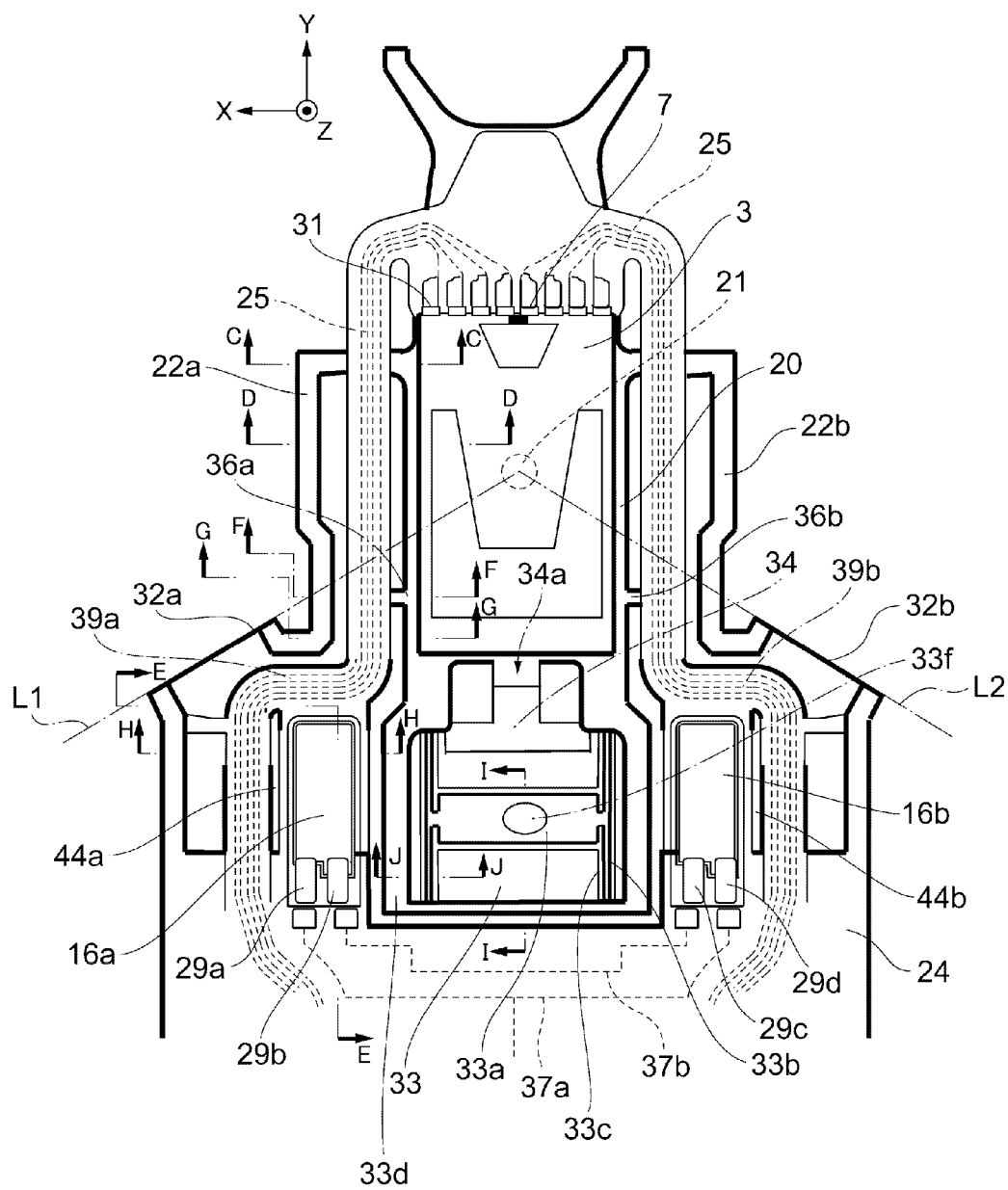
FIG. 6 is a plan view showing the main part of the front end in the head assembly according to a preferable embodiment of the present invention when viewed from the upper side.
Figure 7:
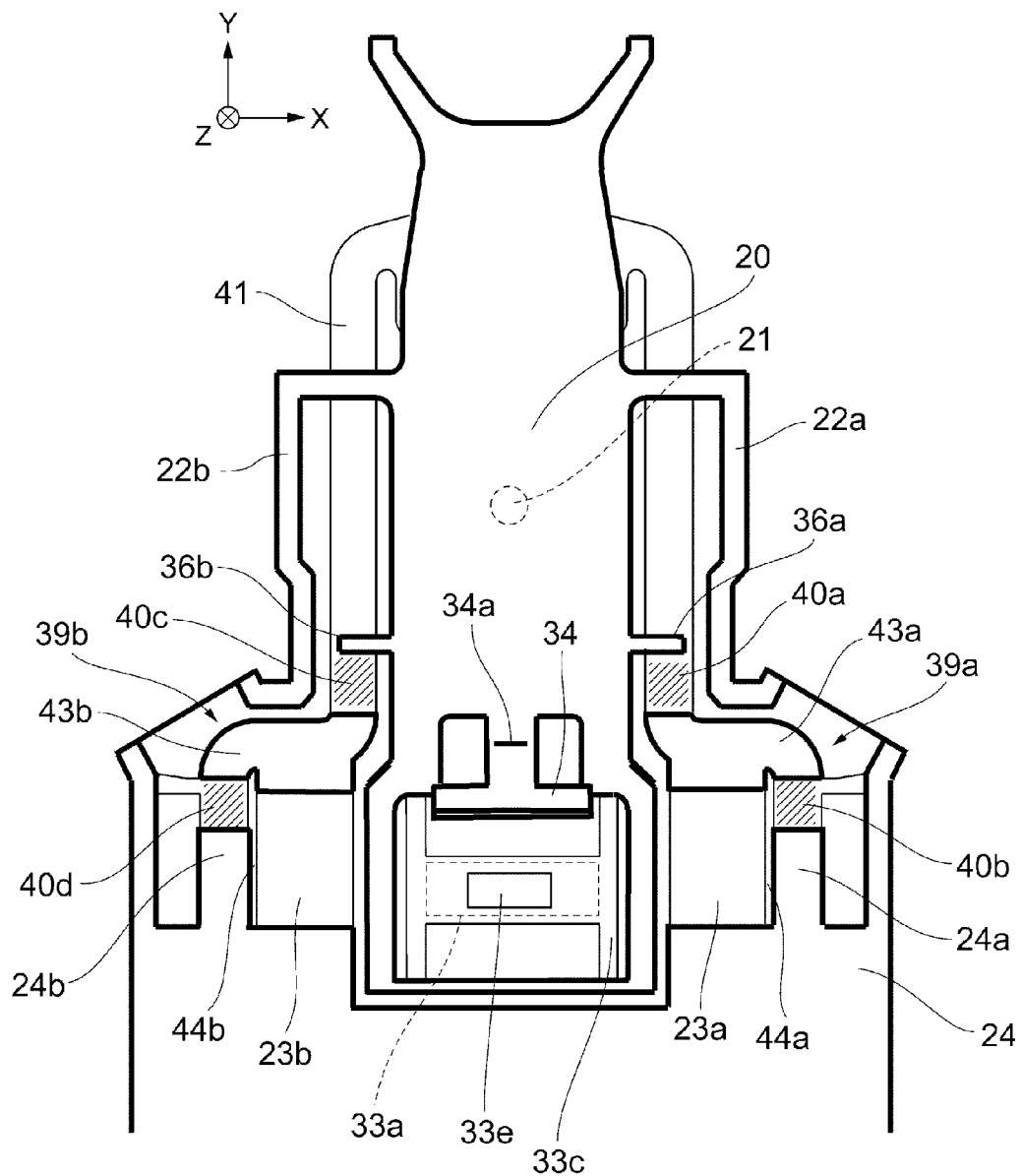
FIG. 7 is a plan view showing the main part of the front end in the head assembly according to a preferable embodiment of the present invention when viewed from the lower side.

FIG. 6 is a plan view showing the main part of the front end of the head assembly according to a preferable embodiment of the present invention when viewed from the upper side (the side where slider is located). FIG. 7 is a plan view showing the main part of the front end of the head assembly according to a preferable embodiment of the present invention when viewed from the lower side (i.e., a plan view showing the head assembly as shown in FIG. 6 from the rear side). For the convenience of description, load beam 14 is not shown.

In FIG. 6, head element wiring 25 (the wiring part) is arranged to surround slider 3. Head electrode terminal 31 of slider 3 is connected to corresponding head element wiring 25 (the wiring part) by the solder ball. First bending part 32a and second bending part 32b are formed on first outrigger 22a and second outrigger 22b which are disposed on both sides of slider supporting plate 20. Further, first bending part 32a and second bending part 32b are disposed in such a manner that crossing point of extended line L1 from first bending part 32a and extended line L2 from second bending part 32b coincides with support projection 21. Thus, first bending part 32a and second bending part 32b are easy to bend, so slider supporting plate 20 rotates in a micro scale around support projection 21.

Head element wiring 25 (the wiring part) are partly fixed to first and second outriggers 22a and 22b (Part C-C in FIG. 6) and also fixed to first driving rib 36a and second driving rib 36b extending from slider supporting plate 20 (Part F-F in FIG. 6).

First and second drive unit 16a and 16b are driven when the voltage is applied to first, second, third and fourth electrode pads 29a, 29b, 29c and 29d. Driving wiring 37a is disposed to input the voltage to first electrode pad 29a and fourth electrode pad 29d, and ground wiring 37b connects second electrode pad 29b and third electrode pad 29c. In this way, if the alternating driving signals are input to driving wiring 37a, first drive unit 16a and second drive unit 16b expand and contract with their movement directions being opposite to each other.

Further, T shaped limiter part 34 is formed on slider supporting part 20 to lift slider 3 from the magnetic disk surface when slider 3 is unloaded from magnetic disk 6 (see FIG. 6 and FIG. 7). T shaped limiter part 34 is formed as bending part 34a, and is processed to bend to the side opposite to slider 3, then is engaged into hole part 35 formed in load beam 14 (as shown in FIG. 3). During the operation other than loading and unloading, T shaped limiter part 34 does not contact with hole part 35.

FIG. 7 is a view showing FIG. 6 from the rear side. In FIG. 7, first link 39a with a high rigidity is formed between first joint 40a and second joint 40b which will be easily deformed. First joint 40a is connected to first driving rib 36a, and second joint 40b is connected by first fixing part 24a which is part of flexure 15. Similarly, second link 39b with a high rigidity is formed between third joint 40c and fourth joint 40d which will be easily deformed. Third joint 40c is connected to second driving rib 36b, and fourth joint 40d is connected by second fixing part 24b which is part of flexure 15.

First separation groove 44a is arranged to separate first drive unit 16a from second joint 40b and flexure board 24. First separation groove 44a is formed along the lengthwise direction (Y-axis direction) of thin film piezoelectric 26 within its length scope. Head assembly 2 has a shape that is axisymmetrical around the symmetry axis which is parallel to Y axis. Second separation groove 44b is the same as first separation groove 44a.

Figure 8A:
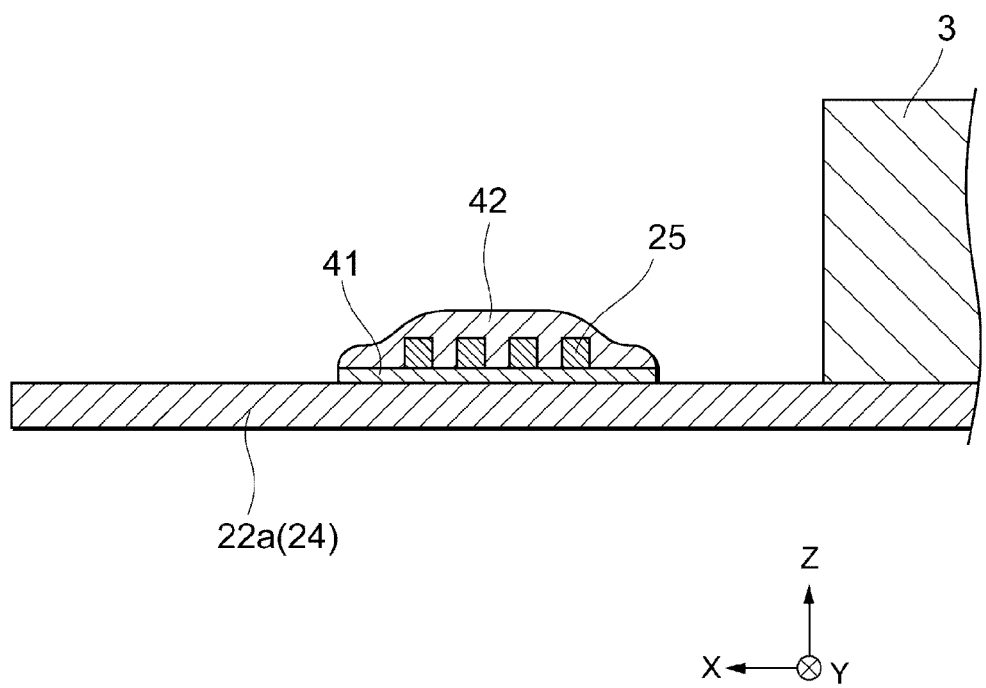
FIG. 8a is a cross-sectional view taken along C-C line in FIG. 6.
Figure 8B:
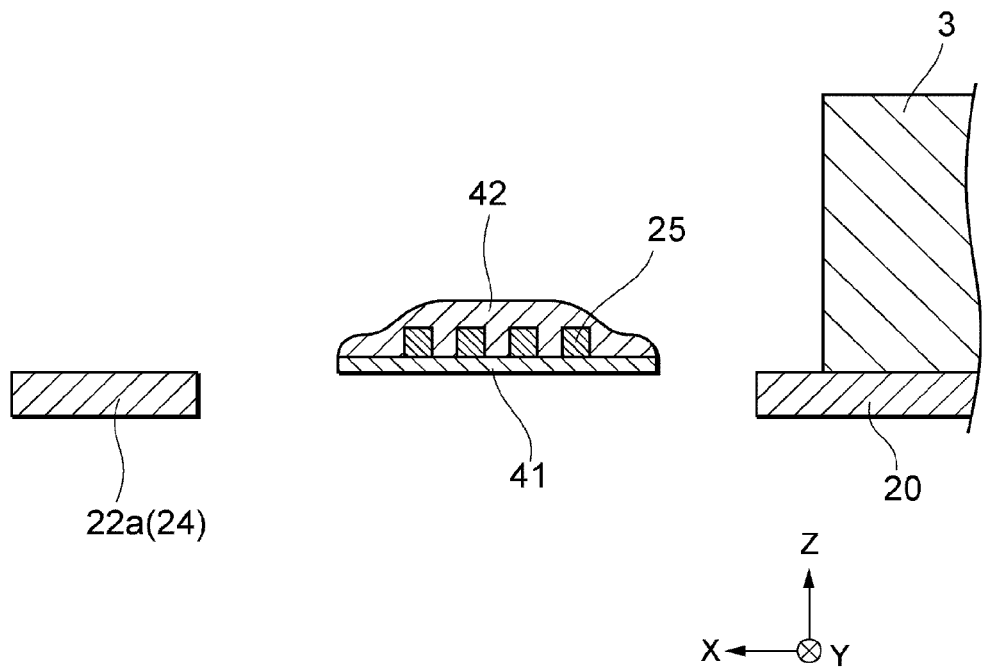
FIG. 8b is a cross-sectional view taken along D-D line in FIG. 6.
Figure 8C:
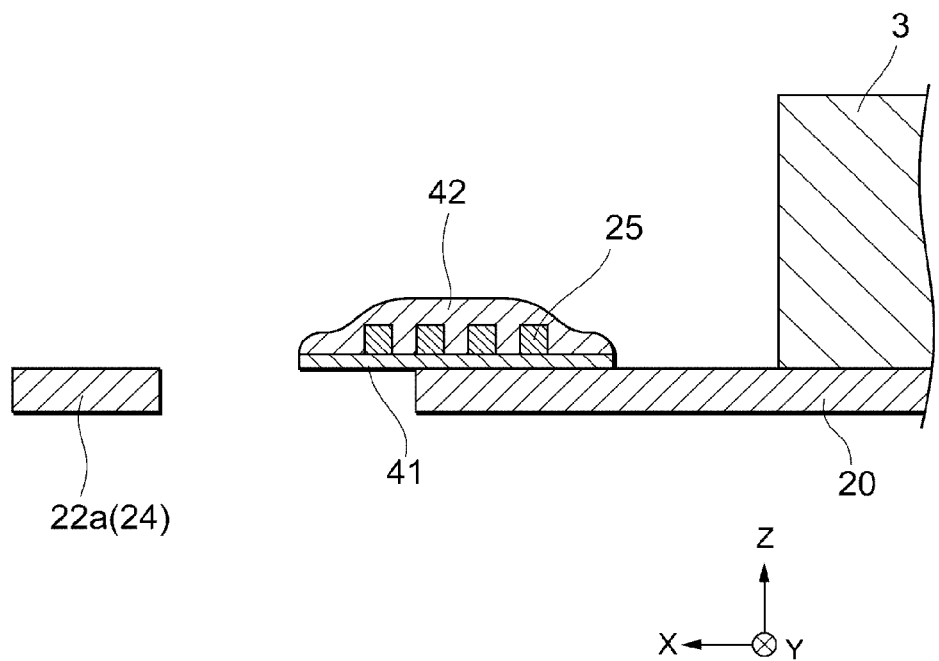
FIG. 8c is a cross-sectional view taken along F-F line in FIG. 6.
Figure 8D:
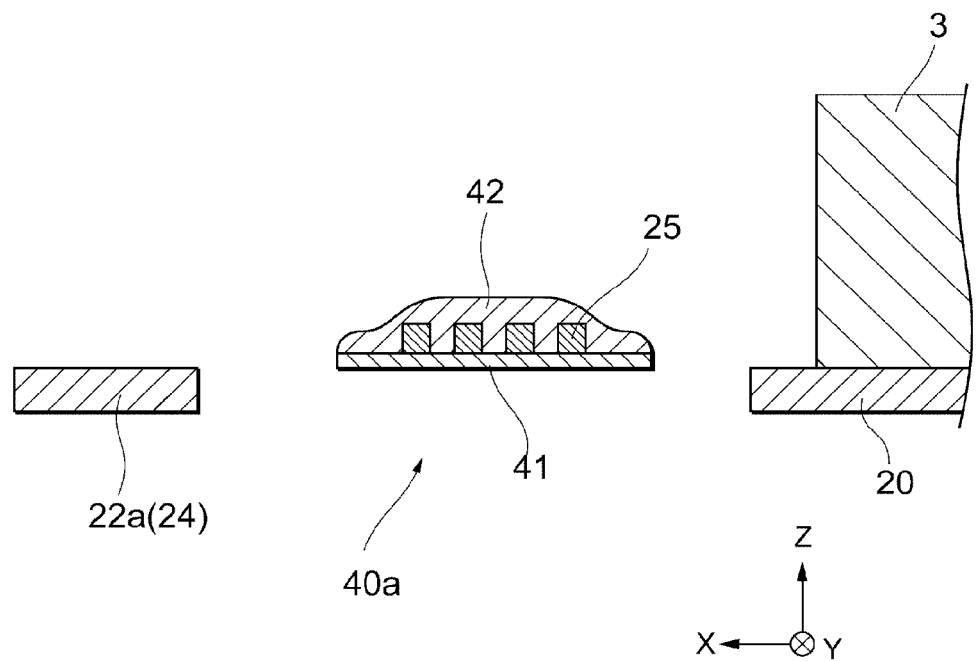
FIG. 8d is a cross-sectional view taken along G-G line in FIG. 6.
Figure 8F:
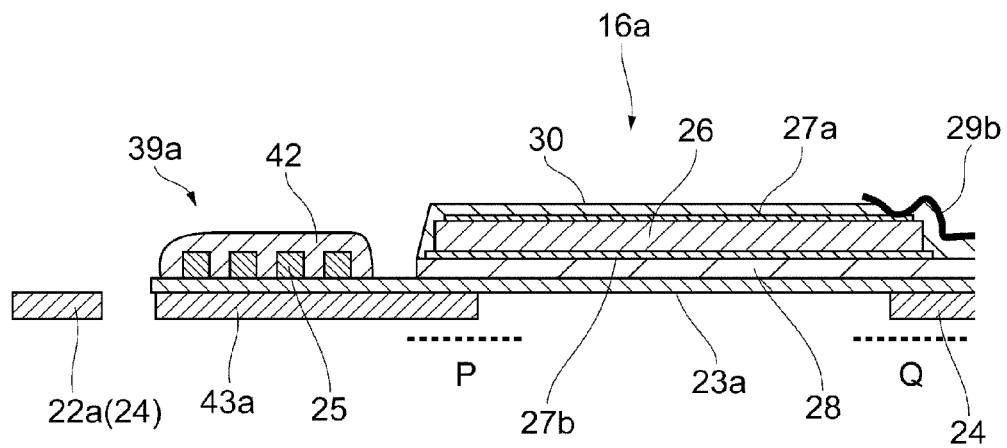
FIG. 8f is a cross-sectional view taken along E-E line in FIG. 6.

FIG. 8a to FIG. 8f are cross-sectional views illustrating the main parts as shown in FIG. 6. With respect to flexure 15, insulating layer 41 made of polyimide or the like is formed on flexure board 24 made of stainless steel material with a thickness of 18 μm, and head element wirings 25 (wiring part) are disposed on insulating layer 41, wherein head element wirings 25 are covered by wiring cover 42 made of polyimide or the like for the purpose of insulation or protection. In addition, in flexure 15, flexure board 24 is processed by etching to provide optional shapes so as to ensure necessary mechanical functions. FIG. 8a is a cross-sectional view showing the cross-section taken along C-C line in FIG. 6. FIG. 8b is a cross-sectional view showing the cross-section taken along D-D line in FIG. 6. FIG. 8c is a cross-sectional view showing the cross-section taken along F-F line in FIG. 6. FIG. 8d is a cross-sectional view showing the cross-section taken along G-G line in FIG. 6. FIG. 8e is a cross-sectional view showing the cross-section taken along H-H line in FIG. 6. And FIG. 8f is a cross-sectional view showing the cross-section taken along E-E line in FIG. 6.

In part C-C as shown in FIG. 8a, first outrigger 22a is composed of flexure board 24 and connected to slider supporting plate 20. Insulating layer 41 is disposed on part of first outrigger 22a, and head element wiring 25 (wiring part) made of copper foil is formed on insulating layer 41. Further, Wiring cover 42 is formed to cover head element wiring 25 (wiring part). In part D-D as shown in FIG. 8b, flexure board 24 on the rear side of head element wiring 25 (wiring part) is removed by etching so that slider supporting plate 20, first outrigger 22a and head element wiring 25 (wiring part) are separated from each other. In part F-F as shown in FIG. 8c, first driving rib 36a which is flexure board 24 extending from slider supporting plate 20 is fixed together with part of head element wiring 25 (wiring part) while head element wiring 25 (wiring part) is separated from first outrigger 22a.

In part G-G as shown in FIG. 8d, first joint 40a has the same cross-sectional shape as that in the cross-section taken along D-D line. It consists of head element wiring 25 (wiring part), insulating layer 41 and wiring cover 42, wherein flexure board 24 of flexure 15 at this part is removed by etching. In part H-H as shown in FIG. 8e, second joint 40b consists of head element wiring 25 (wiring part), insulating layer 41 and wiring cover 42, wherein flexure board 24 of flexure 15 at this part is removed by etching. First and second joints 40a and 40b have a flexible construction compared to first link 39a. Thus, when first drive unit 16a actions as expanding and contracting, first link 39a rotates in a micro scale around second joint 40b. Similarly, when second drive unit 16b actions as expanding and contracting, second link 39b rotates in a micro scale around fourth joint 40d. With such linkage, slider supporting plate 20 rotates around support projection 21.

As shown in FIG. 8f, first drive unit 16a is bonded to first piezoelectric supporting part 23a at a position where first diving unit 16a and strengthening plate 43a of first link 39a overlap (the part in FIG. 8f with dotted line P). In addition, first drive unit 16a is bonded to first piezoelectric supporting part 23a at a position where the front end part in the other end of first diving unit 16a and flexure board 24 of flexure 15 overlap (the part in FIG. 8f with dotted line Q). The same applies to second drive unit 16b. It is bonded to second piezoelectric supporting part 23b at a position where front end part in one end of second diving unit 16b and strengthening plate 43b of second link 39b overlap. In addition, the front end part in the other end of second drive unit 16b is bonded to second piezoelectric supporting part 23b at a position where second drive unit 16b and flexure board 24 of flexure 15 overlap. As such, the displacement of thin film piezoelectric 26 can be transferred to first link 39a (or second link 39b) in a reliable manner.

In the present embodiment, dynamic vibration absorber 33 is disposed closer to the rear end side of load beam 14 than support projection 21 and is also located between first drive unit 16a and second drive unit 16b to be held by these drive unit. Dynamic vibration absorber 33 is composed of first weight part 33a, second weight part 33e, spring part 33b for connecting first weight part 33a to slider supporting plate 20, damping part 33c for eliminating vibration amplitude of first weight part 33a relative to the slider supporting plate 20, and frame part 33d for supporting spring part 33b and damping part 33c. First weight part 33a and spring part 33b are formed on insulating layer 41 of flexure 15 by etching of the same copper foil as head element wiring 25. In addition, damping part 33c is formed as a part of insulating layer 41 made of polyimide, and is formed by etching. Second weight part 33e is formed as a part of flexure board 24, and is formed by etching. In this way, the structure of dynamic vibration absorber 33 can be processed by etching processes of flexure 15, and no new processing step is needed so that processing cost will not increase at all.

In the present embodiment, first weight part 33a and second weight part 33e are substantially rectangle and are disposed along X-axis direction as shown in drawings. However, the shape can be set at will as long as the shape is symmetrical around the Y axis as shown in drawings. Also, first weight part 33a and second weight part 33e function as the mass part of dynamic vibration absorber 33.

Frame part 33d is disposed as a frame-shape to surround first weight part 33a, spring part 33b and second weight part 33e. Spring part 33b is disposed to extend in the negative direction of Y axis, and one end in the lengthwise direction is connected to frame part 33d. In addition, the center or its vicinity in the lengthwise direction of spring part 33b is connected to first weight part 33a.

As such, first weight part 33a, second weight part 33e, spring part 33b and damping part 33c present a substantial H shape as a whole. With such a structure, dynamic vibration absorber 33 has vibration freedom in the rotating direction of slider supporting plate 20. Here, damping 33c functions to suppress the vibration in the rotating direction of slider supporting plate 20.

Figure 9:
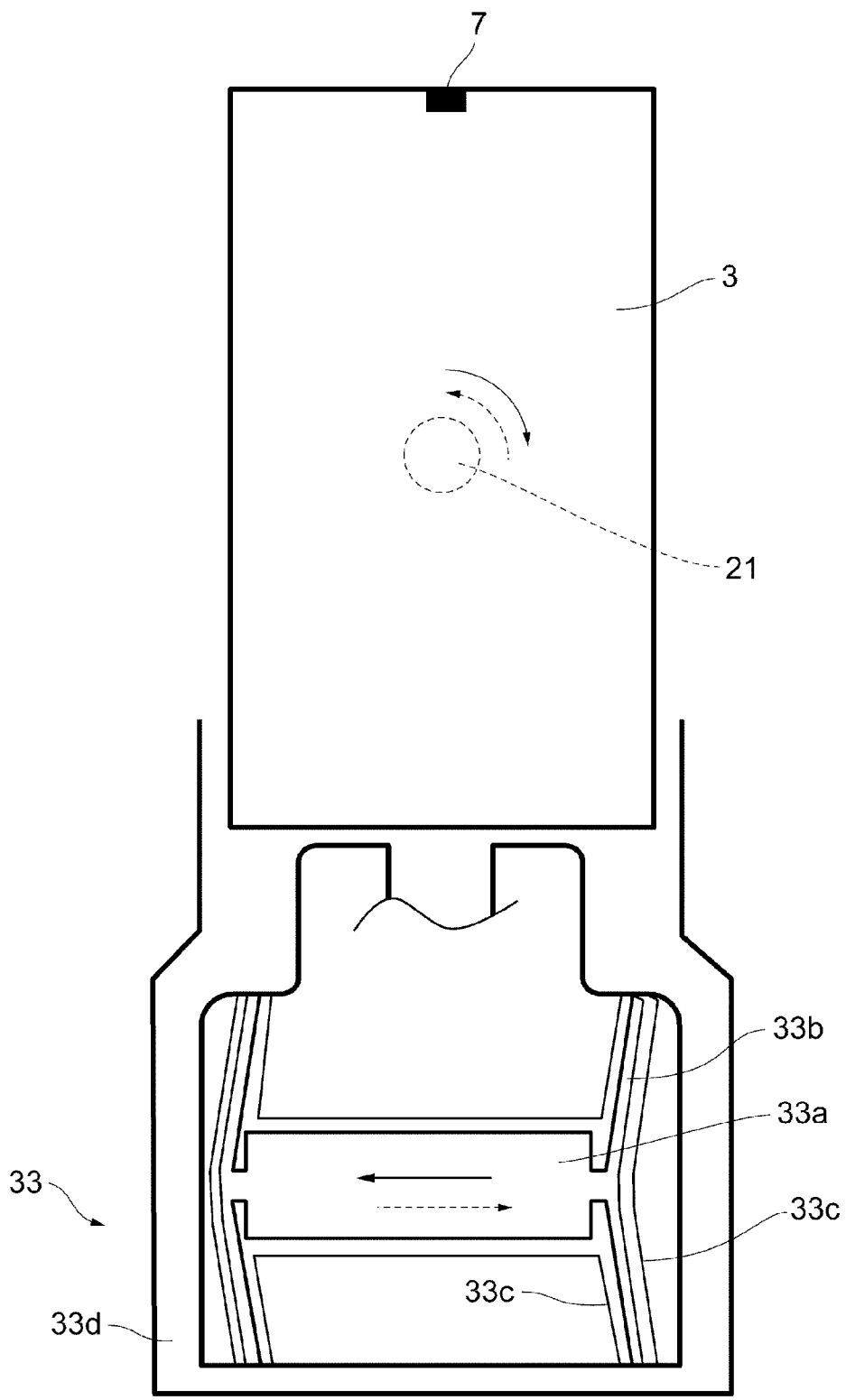
FIG. 9 is a view showing the operation status of the dynamic vibration absorber.

FIG. 9 is a view showing the operation state of dynamic vibration absorber. When slider 3 rotates around support projection 21, first weight part 33a (second weight part 33e) vibrates back and forth in the direction indicated by the arrow in the figure. The direction indicated by the arrows coincide with the directions in which head element 7 of slider 3 crosses the recording track. In the resonance mode where slider 3 resonates in large amplitude, first and second weight parts 33a and 33e of dynamic vibration absorber 33 absorb the vibration of slider 3 to suppress resonance.

Figure 10A:
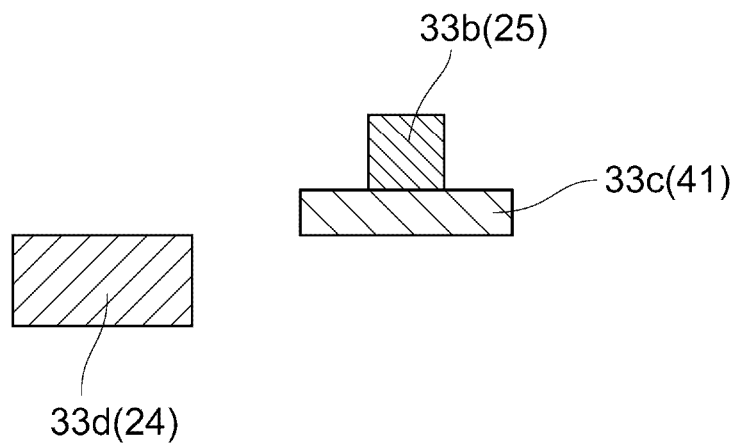
FIG. 10a is a cross-sectional view taken along J-J line in FIG. 6.
Figure 10B:
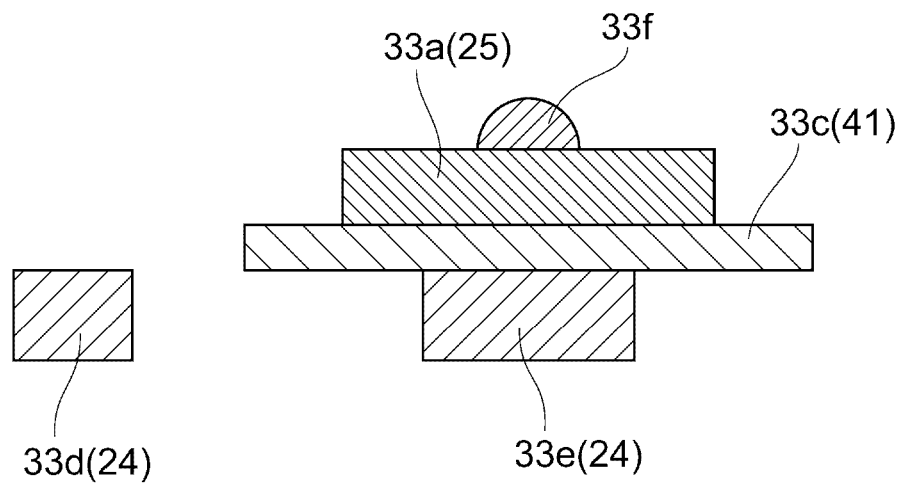
FIG. 10b is a cross-sectional view taken along I-I line in FIG. 6.

FIG. 10a and FIG. 10b are views showing the cross-section of dynamic vibration absorber 33, wherein FIG. 10a is the cross-sectional view showing the cross-section taken along J-J line in FIG. 6 and FIG. 10b is the cross-sectional view showing the section taken along I-I line in FIG. 6. Spring part 33b is disposed at the upper surface side of damping part 33c made of insulating layer 41. In addition, first weight part 33a is disposed at the upper surface side of insulating layer 41 and second weight part 33e is disposed at the rear surface side of insulating layer 41. Since the resonance frequency of dynamic vibration absorber 33 matches the optimal value, the shapes of first weight part 33a and second weight part 33e can be determined at will. In addition, first weight part 33a may also contain a mass adjustment part. In particular, solder ball 33f is added to first weight part 33a to adjust the resonance frequency in a micro scale. A position can be set to add solder ball 33f on the symmetry axis that goes through support projection 21 (Y axis). Also, several positions which are symmetrical around the center axis can be set to add solder balls 33f. Further, no wiring cover layer 42 is disposed at the position in first weight part 33a where solder ball 33f is added.

Example

Hereinafter, according to the present embodiment, the head assembly with the following frequency response characteristic is specifically described. The head assembly does not resonate in the track direction of the head element.

Conventional Examples

Figure 18:
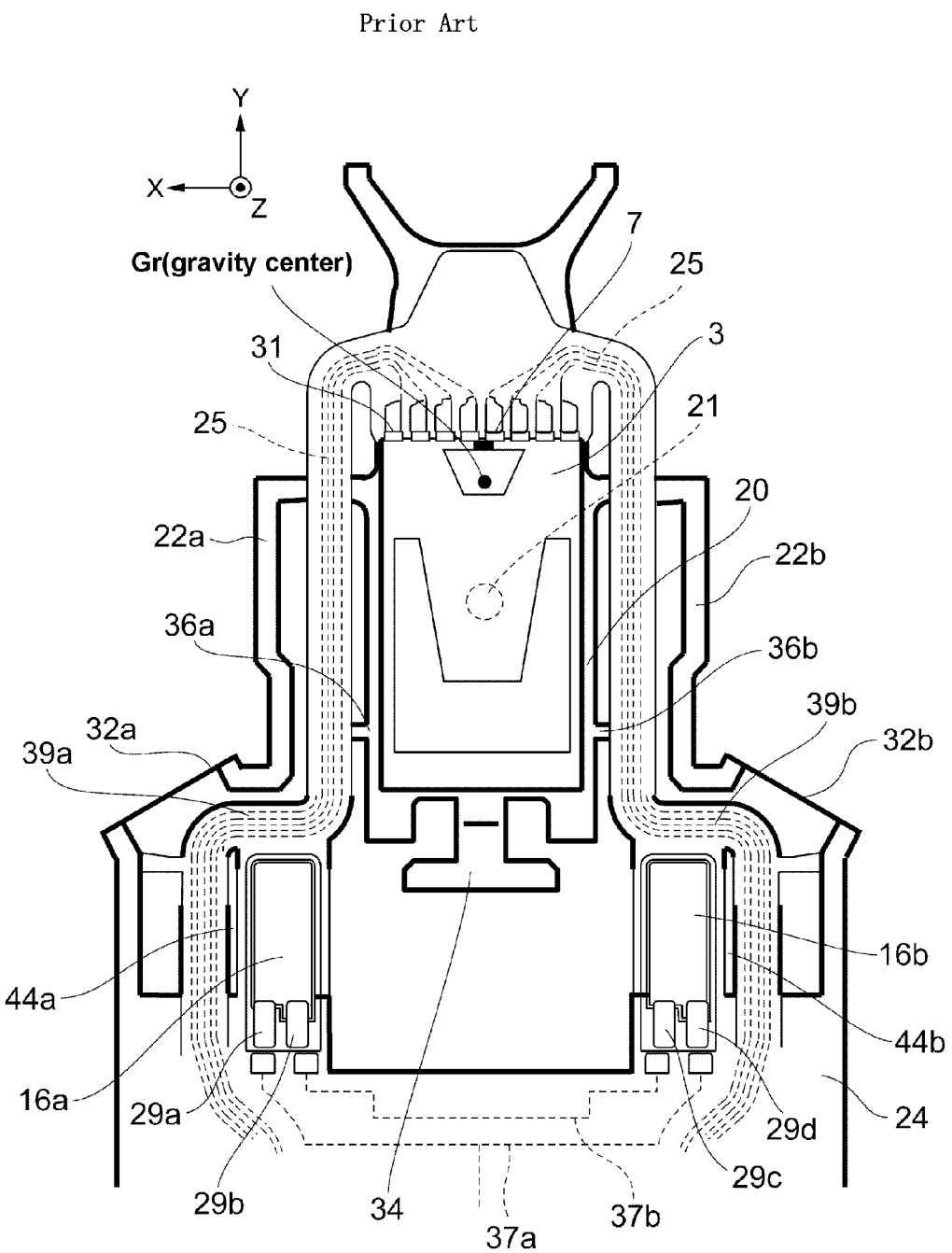
FIG. 18 is a plan view showing the main part of the front end in the head assembly according to the first conventional example when viewed from the upper side.
Figure 20:
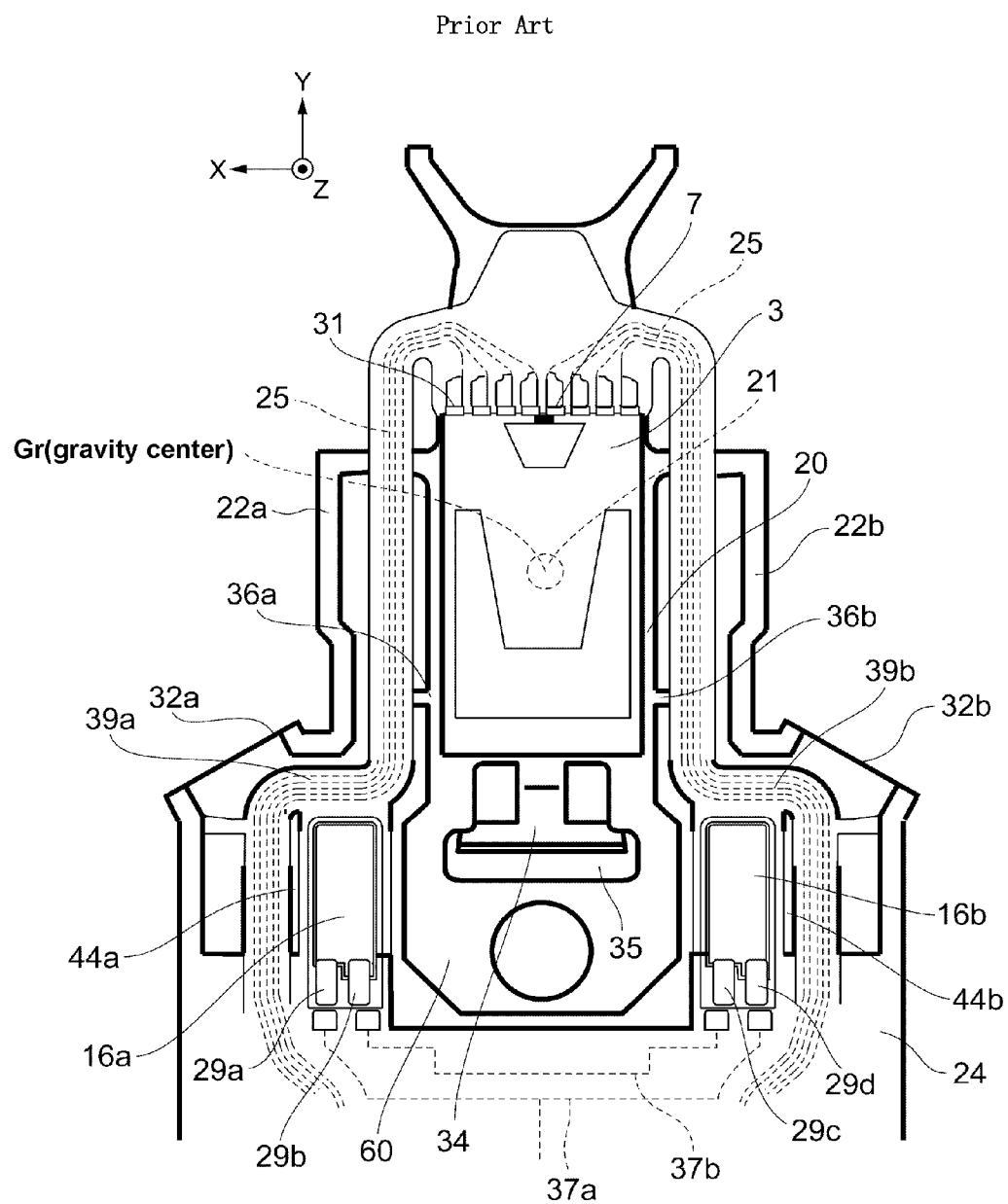
FIG. 20 is a plan view showing the main part of the front end in the head assembly according to the second conventional example when viewed from the upper side.

First of all, the configurations in the first and second conventional examples will be described. FIG. 18 is a view showing the head assembly in the first conventional example, and FIG. 20 is a view showing the head assembly in the second conventional example. The head assembly having the first conventional configuration as shown in FIG. 18 is a head assembly having almost the same configuration as that of head assembly 2 of the present invention as shown in FIG. 6 except that no dynamic vibration absorber 33 is contained. In addition, the head assembly having the second conventional configuration as shown in FIG. 20 is a head assembly described in Patent document 2 in which a structure is used instead of dynamic vibration absorber 33 in the structure of head assembly 2 of the present embodiment as shown in FIG. 6, wherein said structure is one with counter balance 60 for adjustment of gravity center being arranged to slider supporting plate 20 and gravity center Gr of the rotating part matching support projection 21. The remaining structure is the same as that as shown in FIG. 6 and the corresponding description is omitted here.

Figure 19A:
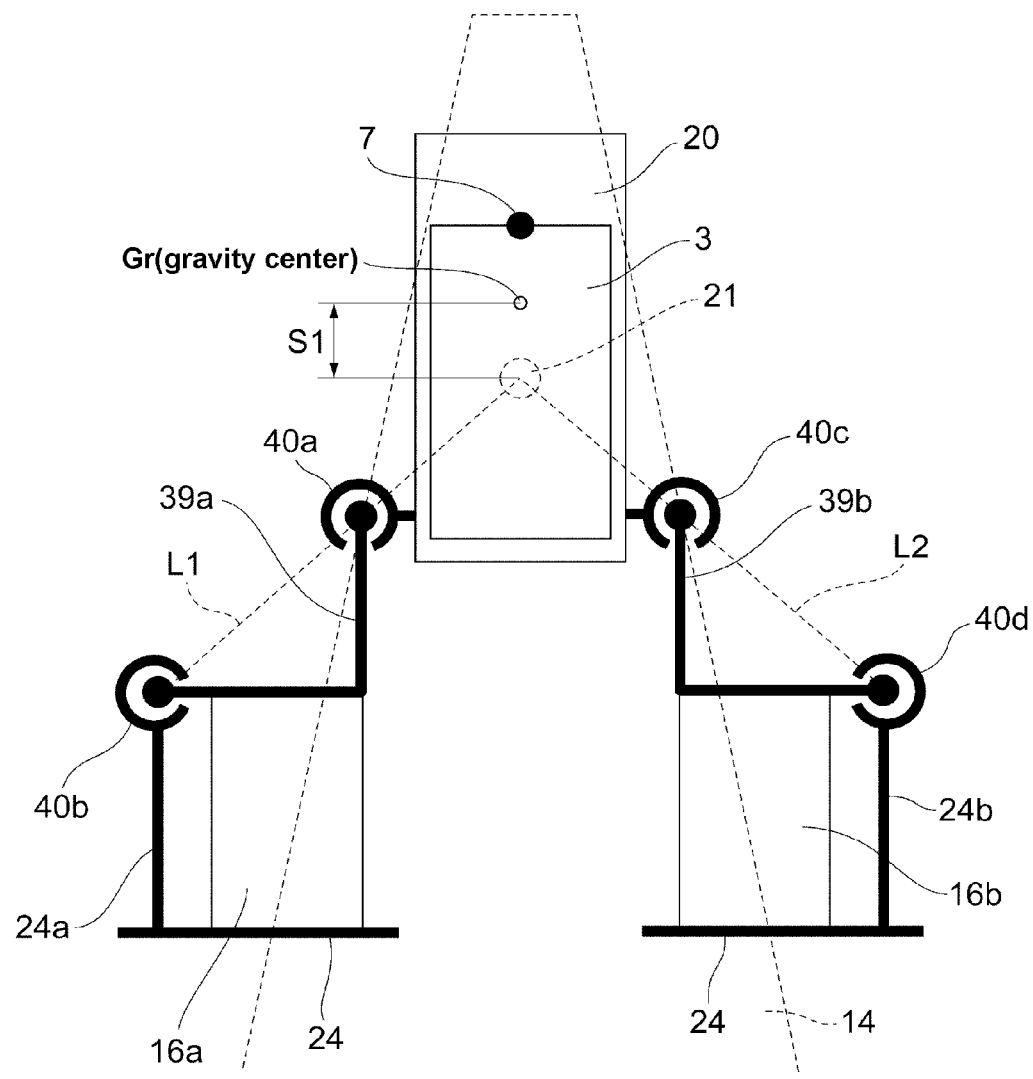
FIG. 19a is a model view showing the configuration of the head assembly in the first conventional example.
Figure 19B:
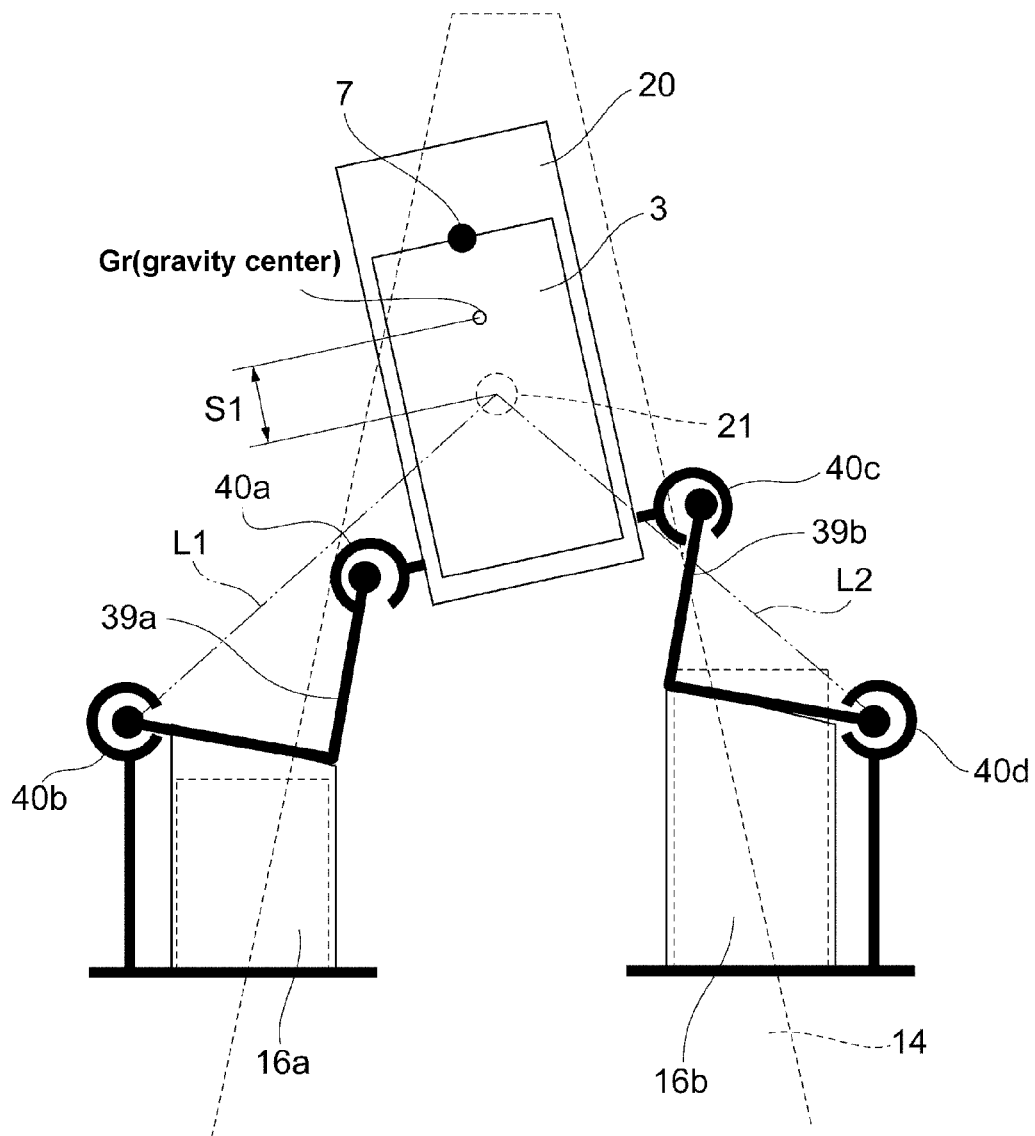
FIG. 19b is a view showing the operation of the head assembly of the first conventional example as shown in the model view.
Figure 19C:
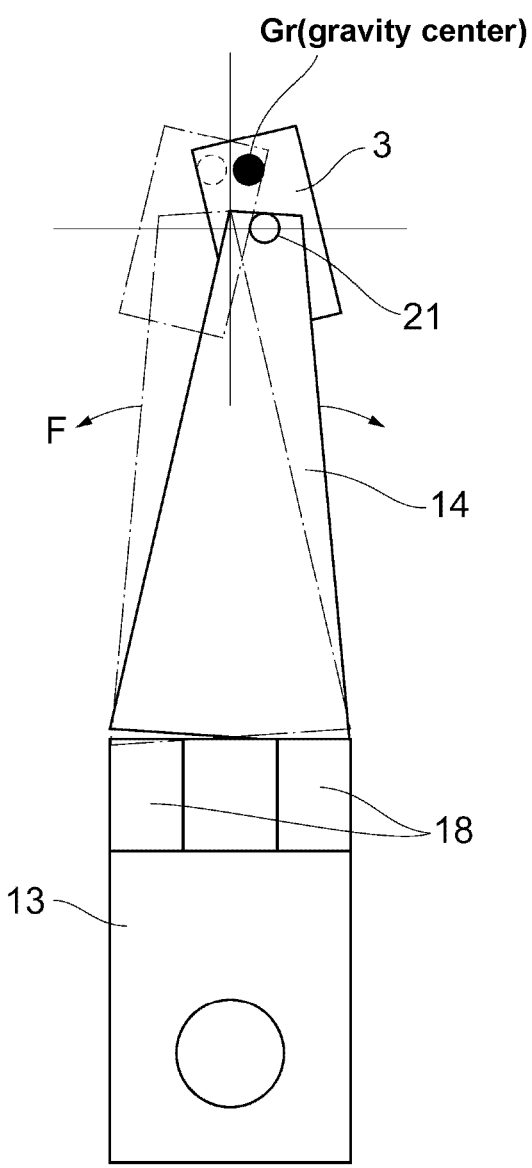
FIG. 19c is a simplified view illustrating the resonance of the load beam in the first conventional example.

FIG. 19a is a simplified model view of the first conventional example. FIG. 19b shows the state in the first conventional example in which an alternating voltage is applied to the first drive unit and the second drive unit so the slider rotates back and forth around the support projection. The gravity center of the rotating part which contains slider 3 and slider supporting plate 20 is located at a site that is away from support projection 21 with a distance $S_1$ towards head element 7. Thus, the gravity center Gr moves in X-axis direction as slider 3 rotates. The reaction force induced by the movement of gravity center Gr is transferred to load beam 14 via support projection 21 so as to shake load beam 14 in X-axis direction. FIG. 19c illustrates the Sway action of the load beam 14.

Figure 19D:
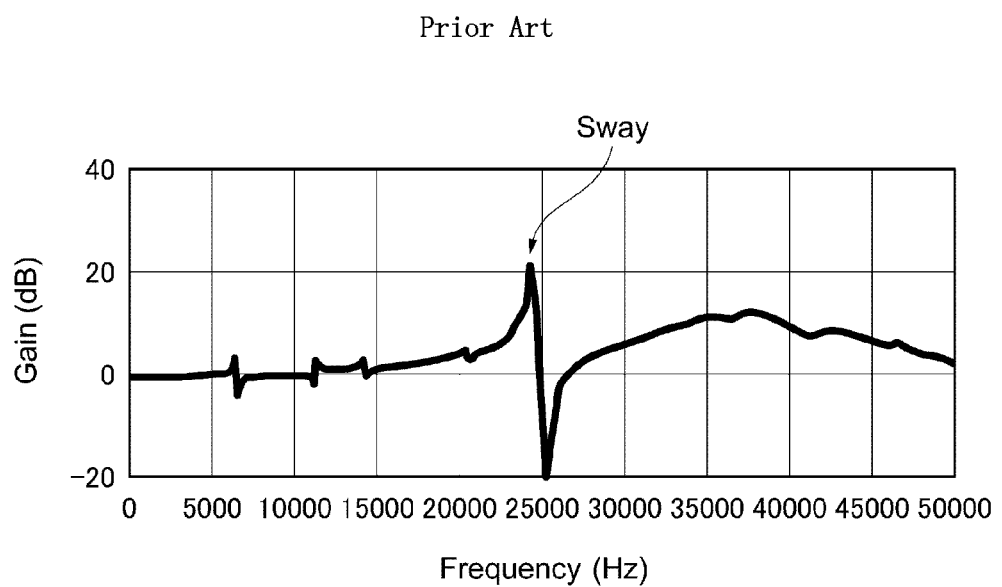
FIG. 19d is diagram showing the frequency response characteristic in the location of the head element in the head assembly according to the first conventional example.

FIG. 19d is a diagram illustrating the response characteristic in the first conventional example with movement of head element 7 in X-axis direction with respect to input voltage applied to the drive unit. For the response characteristics, a large grain peak of 20 dB is exhibited at the frequency of 25 kHz. Gravity center Gr of the rotating part which contains slider 3 and slider supporting plate 20 leaves support projection 21, and the reaction force in X-axis direction generated by the rotating movement is transferred to load beam 14 via support projection 21. If the frequency of the rotating movement is the same with of load beam 14 in Sway mode, the resonance of Sway mode will be excited in load beam 14.

Figure 21A:
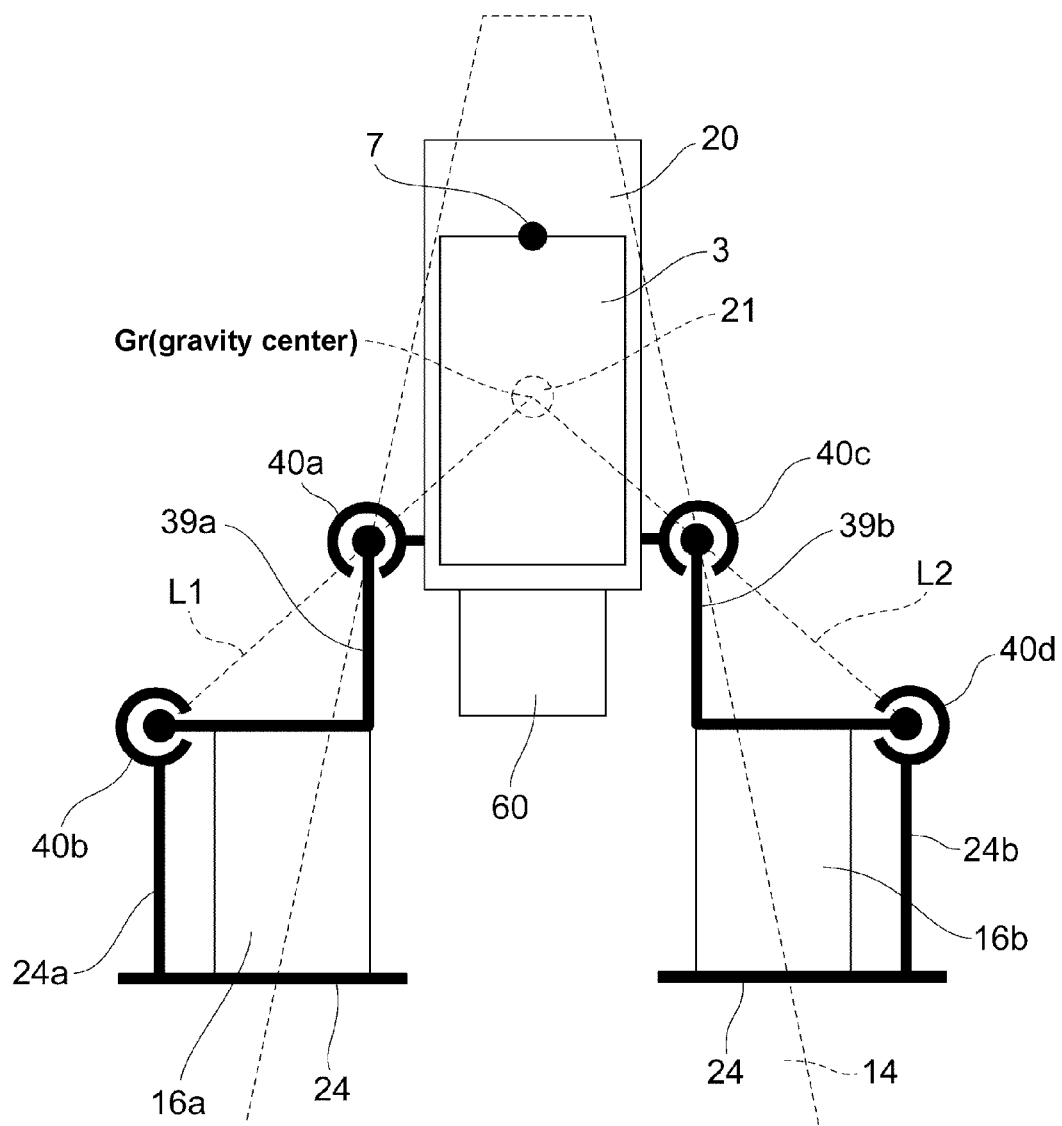
FIG. 21a is a model view showing the configuration of the head assembly in the second conventional example.
Figure 21B:
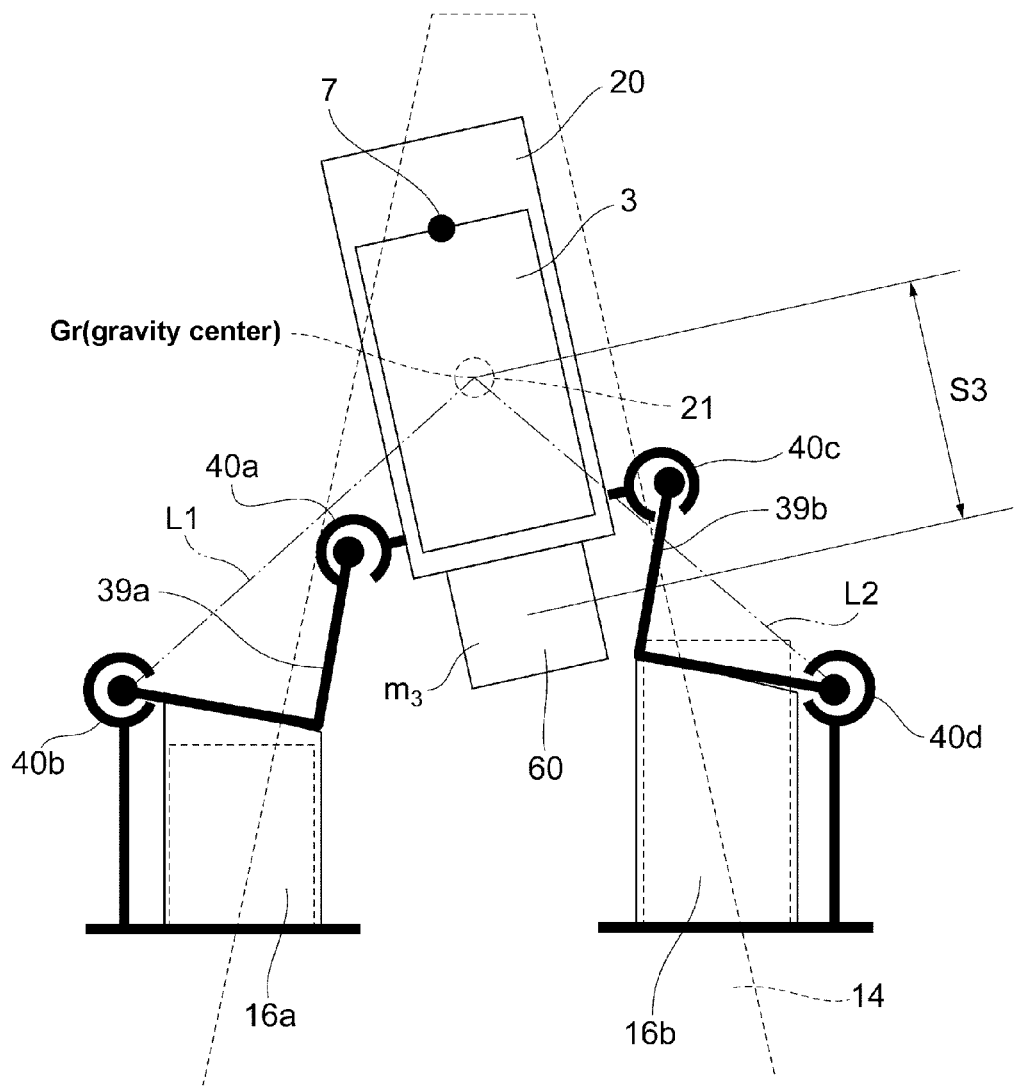
FIG. 21b is a view showing the operation of the head assembly of the second conventional example as shown in the model view.
Figure 21C:
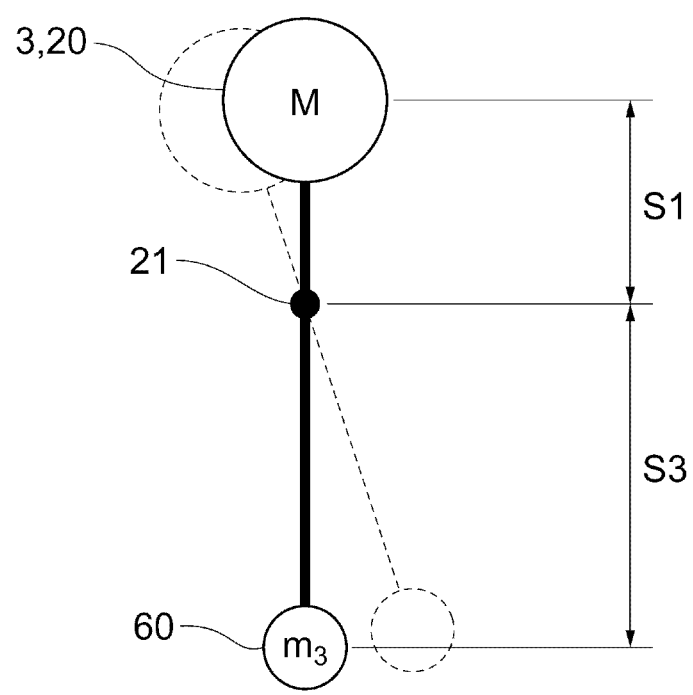
FIG. 21c is a model view of the second conventional example where the rotating part and the counter balance of the slider have been further simplified.

Next, the second conventional example will be described. FIG. 21a is a model view wherein the second example of prior as shown in FIG. 20 is simplified. FIG. 21b shows the state in the second conventional example in which an alternating voltage is applied to the first drive unit and the second drive unit so that the slider rotates back and forth around the support projection. FIG. 21c is a model view where the rotating part of slider and the counter balance in the second conventional example is further simplified. Here, M represents the weight of the rotating part which contains slider 3 and slider supporting plate 20 in the first conventional example, and $m_3$ represents the mass of counter balance 60. In addition, $S_1$ represents the distance between the mass center of M and support projection 21, and $S_3$ represents the distance between the mass center of counter balance 60 and support projection 21. If the gravity center of the rotating part (containing slider 3 and slider supporting plate 20) and counter balance 60 as a whole is located at support projection 21, the reaction force will not generate on support projection 21 when the whole is rotating back and forth. If a simple equation is used to express the condition with the gravity center located at support projection 21, the following equation (1) is provided.

[Equation 1]

$$M \times S_1 = m_3 \times S_3 \quad (1)$$

If the variables on both sides are multiplied by the angular velocity of the rotation amount θ in the rotating movement, the following equation 2 is provided.

[Equation 2]

$$M \times \dot{\theta} \times S_1 = m_3 \times \dot{\theta} \times S_3 \quad (2)$$

Here, angular velocity×distance gets velocity. When the angular velocity of rotating amount θ×distance $S_1$ is defined as velocity $V_1$ and the angular velocity of rotating amount θ×distance $S_3$ is defined as velocity $V_3$, the following equation (3) is provided.

[Equation 3]

$$M \times V_1 = m_3 \times V_3 \quad (3)$$

Figure 21D:
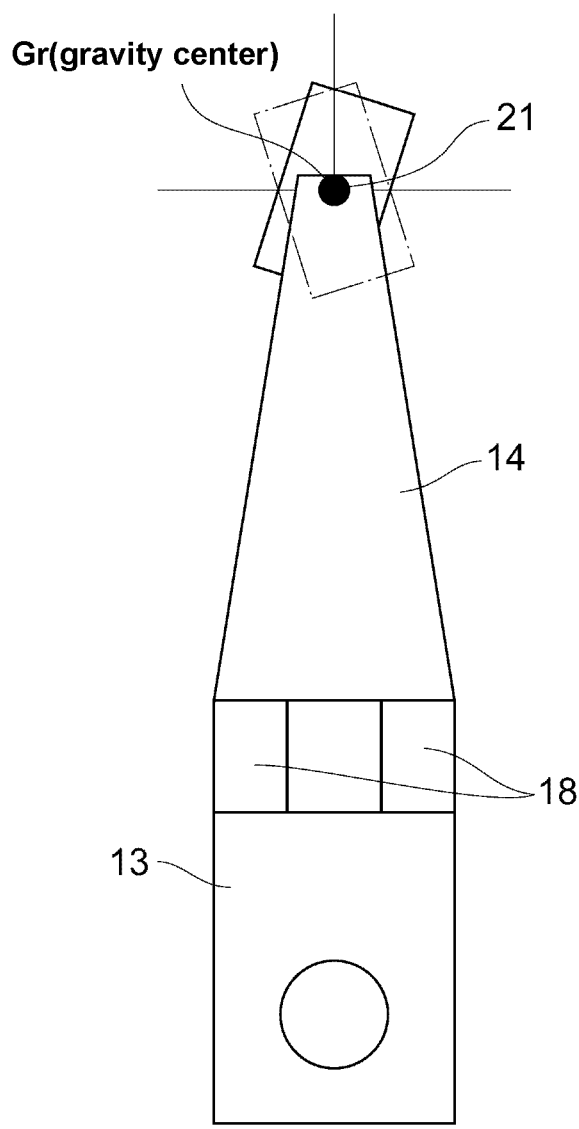
FIG. 21d is a simplified view illustrating the configuration in the second conventional example where no resonance occurs in the load beam.

Thus, if a balance is get between the movement amount of M and that of m3 with support projection 21 as the center, the reaction force will not act on support projection 21. In other words, as the reaction force does not act on support projection 21, load beam 14 stays still even in Sway mode. This state is shown in FIG. 21d.

Figure 21E:
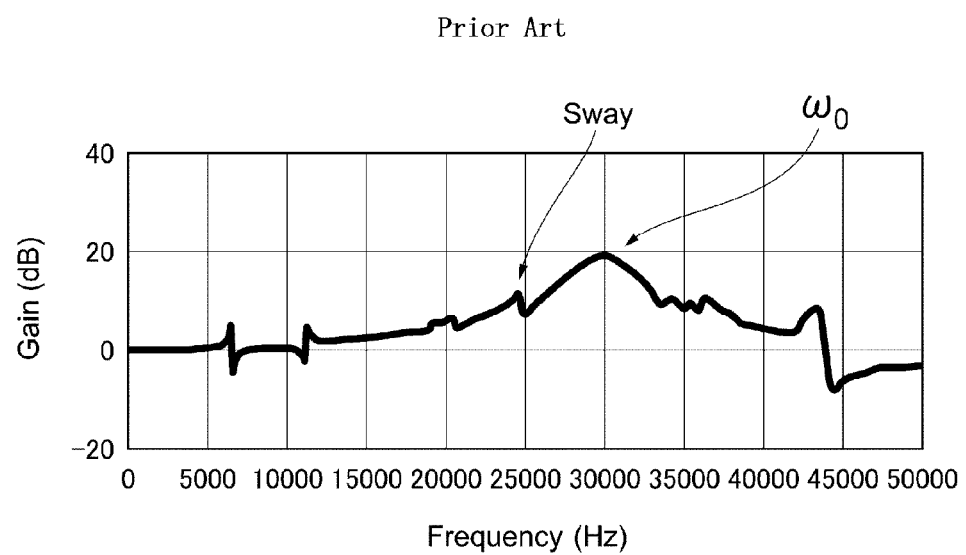
FIG. 21e is diagram showing the frequency response characteristic in the location of the head element in the head assembly according to the second conventional example.

FIG. 21e is a diagram illustrating the response characteristic in the second conventional example with movement of the head element in X-axis direction with respect to input voltage applied to the drive unit. The resonance of load beam in Sway mode can be substantially declined at 25 kHz by adding counter balance 60 and reducing the influence of the reaction force on support projection 21. However, a new resonance wave peak is generated at 30 kHz. The resonance depends on the masses of slider 3 and slider supporting 20 and also the spring constant of drive unit 16, and the resonance is the one of slider 3 in Yaw direction. As such, in the second conventional example, the resonance at 25 kHz occurred in the first conventional example is ameliorated, but new resonance at 30 kHz is generated. This becomes the technical problem in the extension of control bands during head location.

Example

Figure 11A:
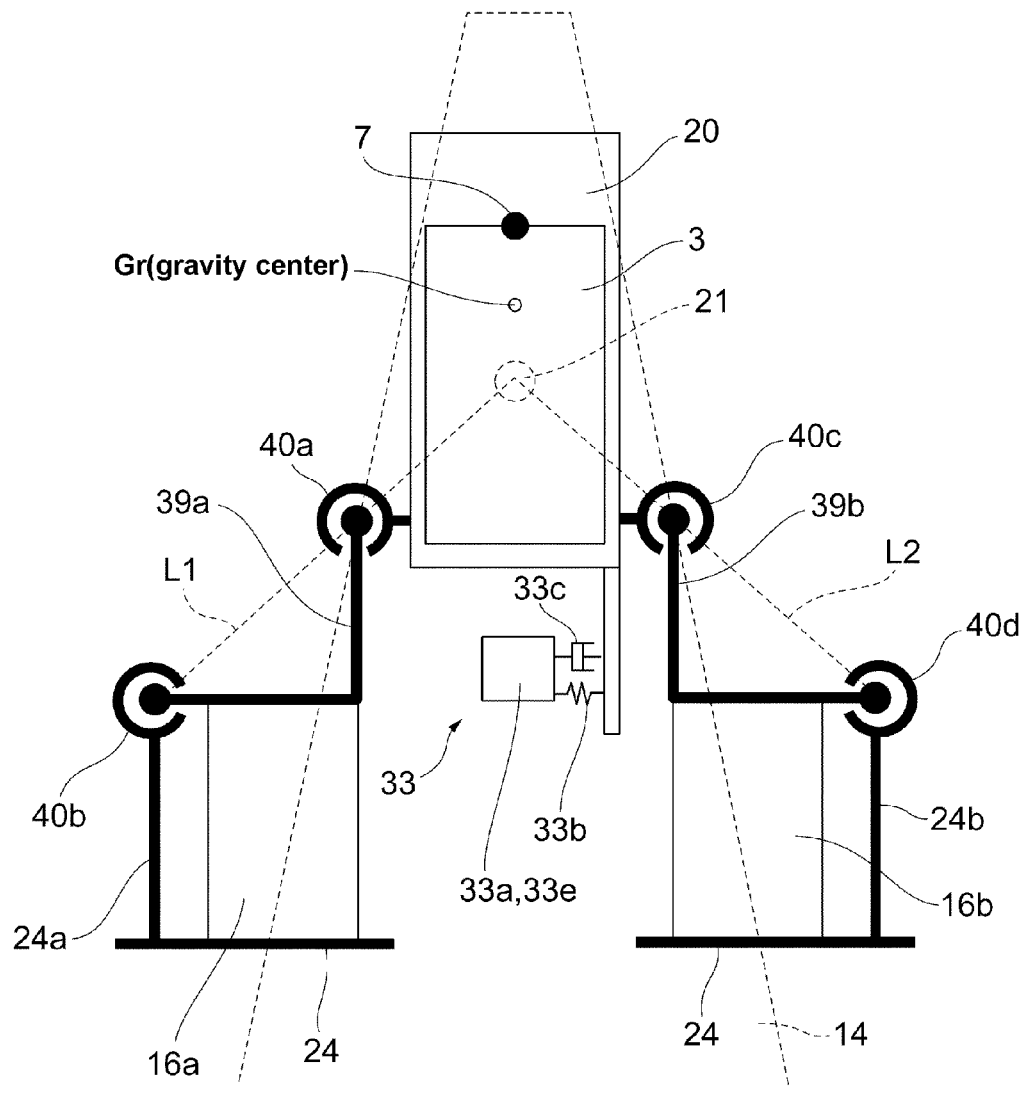
FIG. 11a is a model view showing an example of the present invention in which the configuration shown in FIG. 6 has been simplified.

Hereinafter, one example of the present invention will be described. FIG. 11a is a model view showing one example of the present invention where the configuration in FIG. 6 is simplified. First weight part 33a (Second weight part 33e) is disposed to slider supporting 20 via spring part 33b and damping part 33c. First drive unit 16a has one end fixed to L shaped first link 39a and has the other end fixed to flexure board 24. First joint 40a and second joint 40b are disposed on both ends of first link 39a. Similarly, second drive unit 16b has one end fixed to L shaped second link 39b and has the other end fixed to flexure board 24. Third joint 40c and fourth joint 40d are disposed on both ends of second link 39b. In FIG. 11a, first line segment L1 for connecting first joint 40a and second joint 40b and second line segment for connecting third joint 40c and fourth joint 40d cross at support projection 21 of load beam 14.

Figure 14:
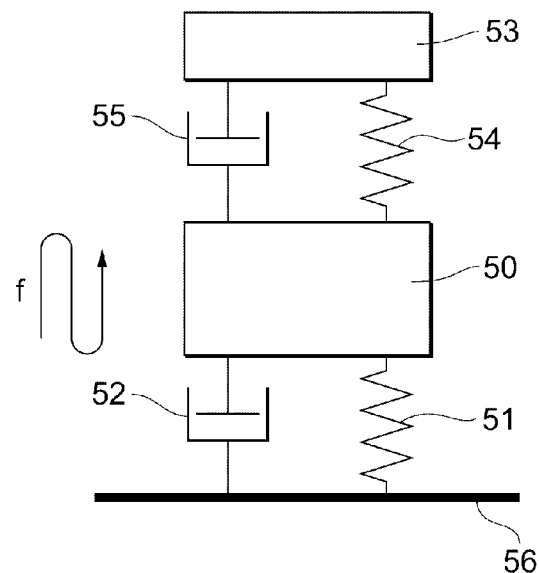
FIG. 14 is a simple model view illustrating the operation of the dynamic vibration absorber in an example of the present invention.

Here, first of all, the function of dynamic vibration absorber in this example will be described. FIG. 14 is a simplied model view illustrating the function of the dynamic vibration absorber generated by the first weight part (the second weight part), the spring part and the damping part. In FIG. 14, main weight part 50 represents the inertial mass of the rotating part which contains slider 3 and slider supporting plate 20. Main spring part 51 mainly represents the elastic coefficient of first drive unit 16a and second drive unit 16b. In addition, main damping part 52 represents the sum of the damping coefficients of insulating cover 30 of drive unit 16, base 28, first and second piezoelectric supporting parts 23a and 23b. Auxiliary weight part 53 represents the sum of inertial masses with support projection 21 as the center which are generated from the masses of first weight part 33a and second weight part 33e. Auxiliary spring part 54 corresponds to spring part 33b, and auxiliary damping part 55 corresponds to damping part 33c. Base plane 56 corresponds to flexure board 24 as shown in FIG. 11a.

Figure 15A:
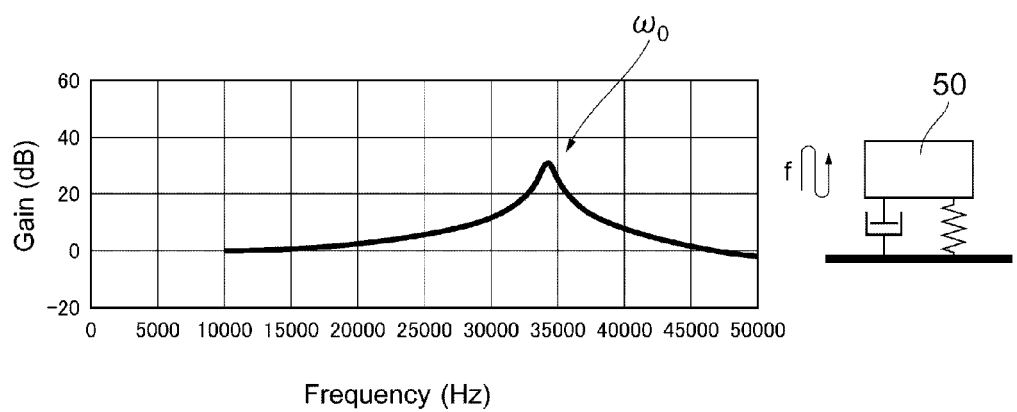
FIG. 15a is a diagram showing the frequency response characteristic to illustrate the operation of the dynamic vibration absorber.

FIG. 15a is a diagram showing the frequency response characteristic when the dynamic vibration absorber in FIG. 14 is removed and periodic external forces f are applied to the main weight part. In this case, the resonance frequency ω0 appears from main weight part 50 and main spring part 51, and ω0 here is represented by the following equation (4). Here, M represents the mass of main weight part 50 (inertial mass), and K represents the spring constant of the main spring part.

[Equation 4]

$$\omega_0 = \frac{1}{2 \cdot \pi} \sqrt{\frac{K}{M}} \quad (4)$$

Figure 15B:
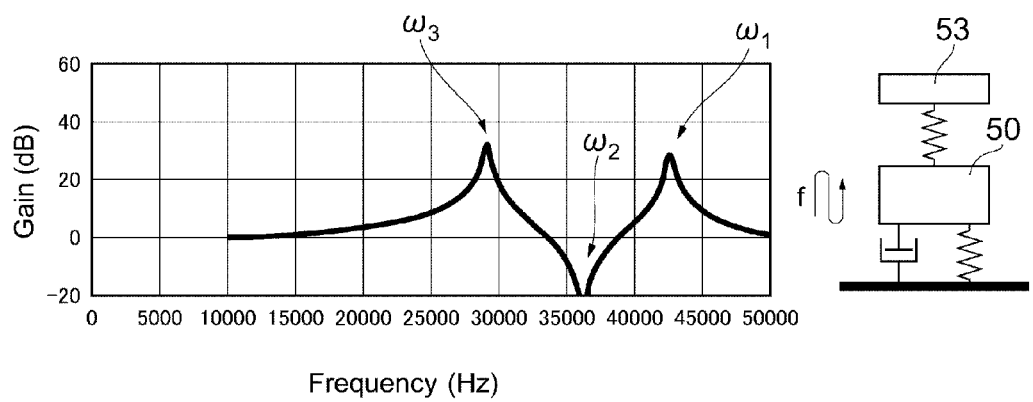
FIG. 15b is a diagram showing the frequency response characteristic to illustrate the operation of the dynamic vibration absorber.

FIG. 15b is a diagram showing the frequency response characteristic when the auxiliary damping part of the dynamic vibration absorber as shown in FIG. 14 is removed. In this frequency response characteristic, two resonance peak values ω1 and ω3 appear, and the anti-resonance peak value ω2 appears between these resonance peak values. Here, ω3<ω2<ω1. If main damping part 52 is neglected, resonance peak value ω1 and ω3 are presented by the following equations (5) and (6). In addition, anti-resonance peak value ω2 is represented by the following equation (7). Here, M represents the mass of main weight part 50 (inertial mass), and K, m and k represent the spring constant of the main spring part, the mass of the auxiliary weight part and the spring constant of the auxiliary weight part, respectively.

[Equation 5]

$$\omega_1 = \sqrt{\frac{k \cdot M + m \cdot (k+K) + \sqrt{\{k \cdot M + m \cdot (k+K)\}^2 - 4m \cdot M \cdot k \cdot K}}{2m \cdot M}} \quad (5)$$

[Equation 6]

$$\omega_3 = \sqrt{\frac{k \cdot M + m \cdot (k+K) - \sqrt{\{k \cdot M + m \cdot (k+K)\}^2 - 4m \cdot M \cdot k \cdot K}}{2m \cdot M}} \quad (6)$$

[Equation 7]

$$\omega_2 = \frac{1}{2\pi} \sqrt{\frac{k}{m}} \quad (7)$$

In order to suppress the resonance at ω0 by using dynamic vibration absorber 33, k and m of dynamic vibration absorber 33 are set in such a manner that anti-resonance frequency ω2 substantially matches ω0.

Figure 15C:
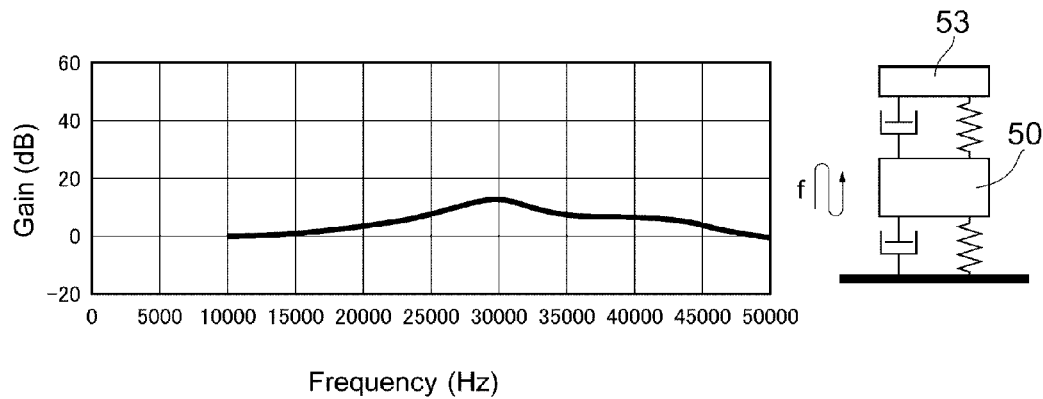
FIG. 15c is a diagram showing the frequency response characteristic to illustrate the operation of the dynamic vibration absorber.

FIG. 15c is a diagram showing the frequency response characteristic of the model as shown in FIG. 14. With the action of auxiliary damping part 55, the resonance peak values appeared in FIG. 15b are eliminated. And smooth characteristic is provided from the low frequency to the high frequency. As such, as dynamic vibration absorber 33 is added to the system originally having a resonance frequency ω0, the resonance frequency ω0 in main weight part 50 is eliminated so as to provide a flat frequency response.

Figure 11B:
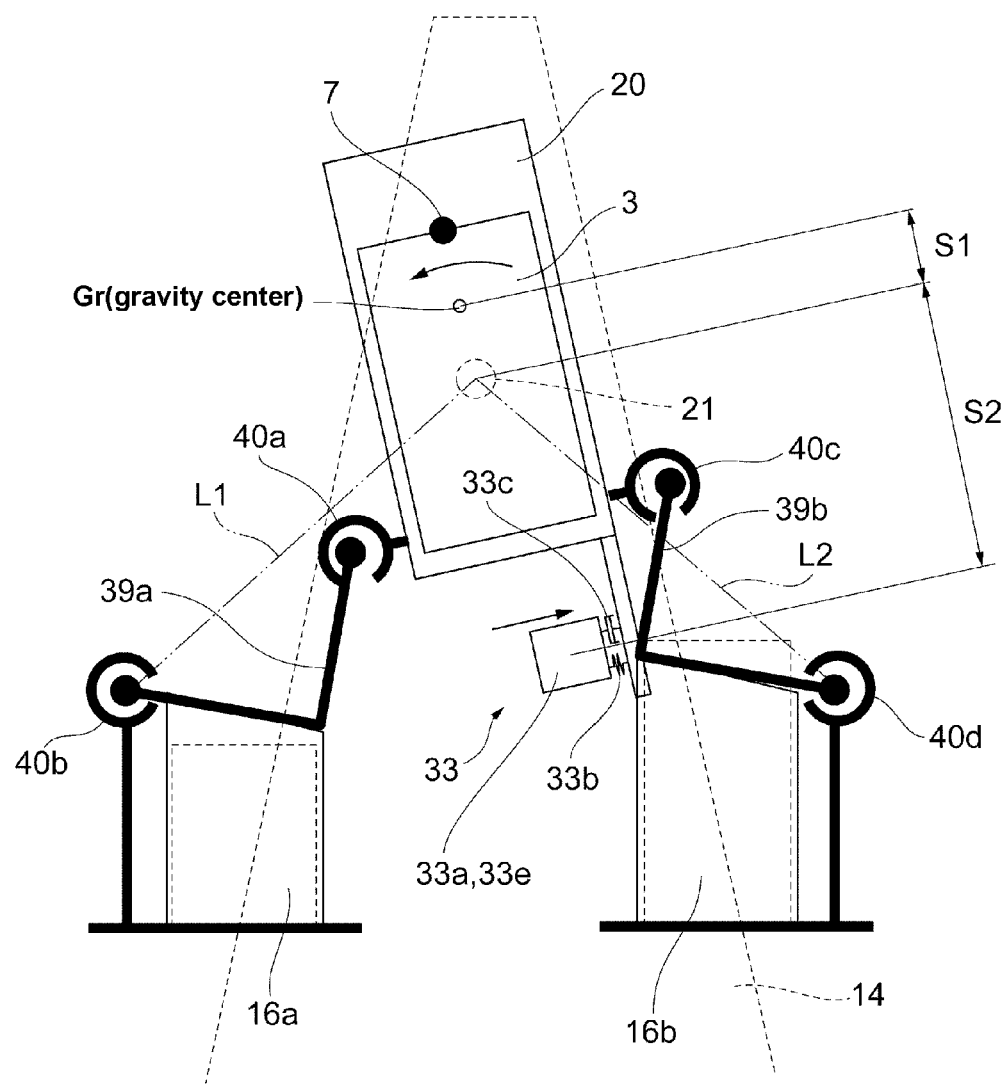
FIG. 11b is a model view showing an example of the present invention where the slider being rotated around the support projection by the first and the second drive unit has been simplified.
Figure 11C:
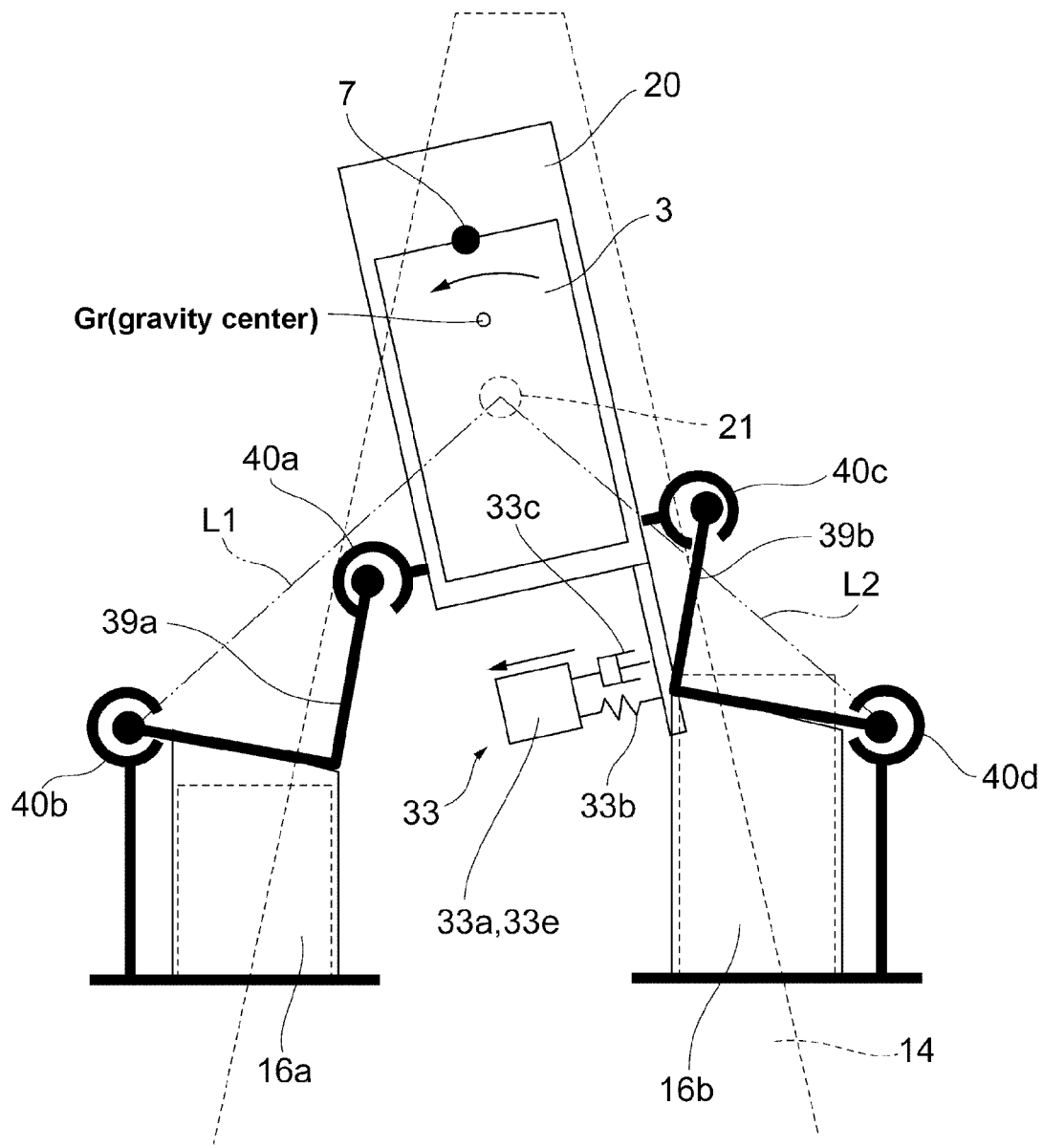
FIG. 11c is a model view showing an example of the present invention where the slider being rotated around the support projection by the first and the second drive unit has been simplified.
Figure 16:
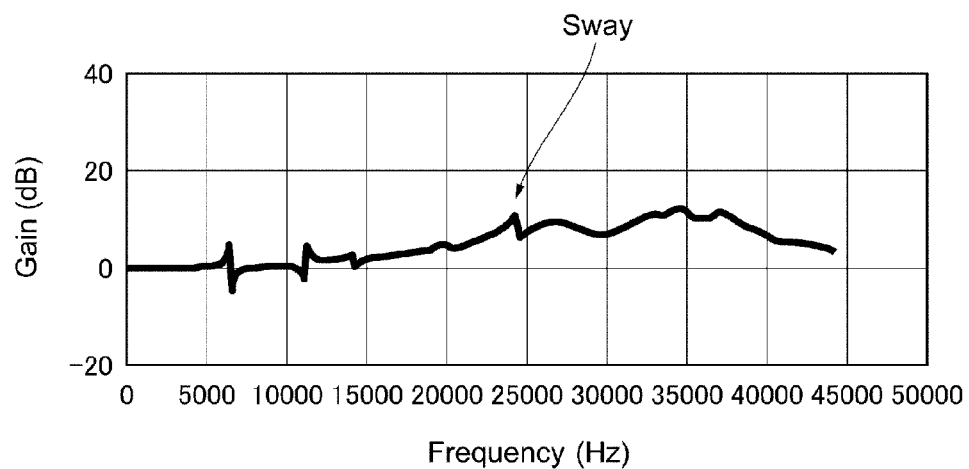
FIG. 16 is a diagram showing the frequency response characteristic in the location of the head element in the head assembly according to an example of the present invention.

Then, the operation in one example of the present invention will be described where dynamic vibration absorber is applied to head assembly 2. FIG. 11c is a model view showing one example of the present invention where the slider being rotated around the support projection by the first and the second drive unit has been simplified. First of all, if first drive unit 16a contracts and second drive unit expands, slider 3 is rotated in the counterclockwise direction in a micro scale around support projection 21 with the action of first link 39a and second link 39b. The response characteristic is shown in FIG. 16 to illustrate displacement of head element 7 in X-axis direction with respect to input voltage applied to drive unit 16. The response characteristic indicates that the resonance peak values have been smoothly suppressed. From the viewpoint of good design of a control system, if the resonance peak values exist in the response characteristic diagram, the control on the gain margin of the characteristic cannot be guaranteed. Thus, to provide a flat frequency response characteristic throughout a wide frequency band is important for the precise location of the head element.

Figure 17:
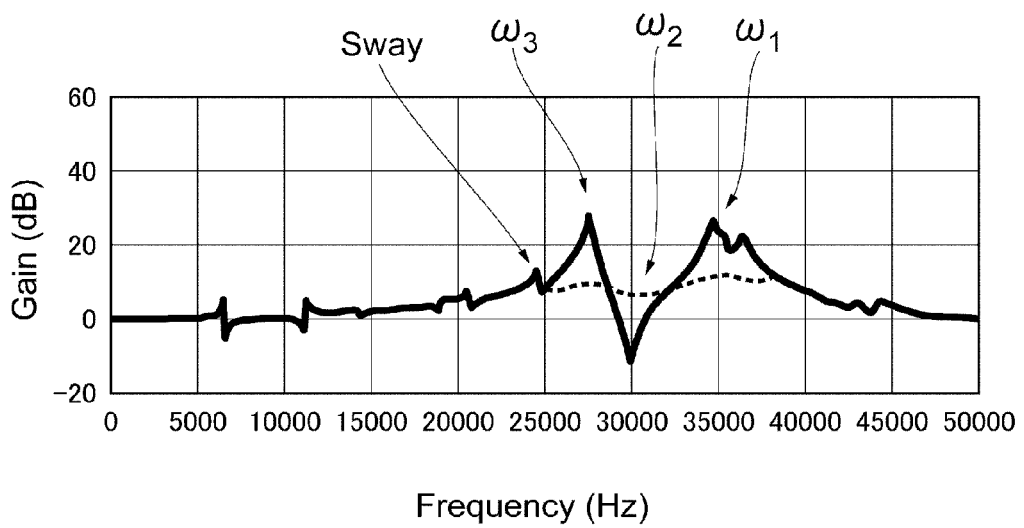
FIG. 17 is a diagram showing the frequency response characteristic to illustrate the damping property of the head assembly in an example of the present invention.

In the first conventional example as shown in FIG. 19d, a large resonance peak value is generated at 25 kHz. The resonance peak value indicates Sway mode of load beam. In this case, for the control characteristic, the control band can only been guaranteed up to approximately 3 kHz. In the second conventional example as shown in FIG. 21e, due to counter balance 60, gravity center Gr of the rotating part of slider 3 and support projection coincide. Thus, no Sway mode occurs in load beam at 25 kHz. However, the rotation mode (Yaw mode) occurs in the slider at 30 kHz. The 30 kHz corresponds to ω0 in FIG. 15a. In this case, it becomes better for the control band compared to that in the first conventional example. However, it is hard to guarantee the control band at 10 kHz. On the other hand, as shown in FIG. 16, in one example of the present invention, as the resonance peak values go smoothly, the control characteristic at 10 kHz or higher can be sufficiently ensured. Here, the response characteristic in FIG. 16 with the damping coefficient neglected is shown in FIG. 17 by a solid line. In FIG. 17, the characteristic shown in a dotted line is the same as that in FIG. 16. According to FIG. 17, it is confirmed that the characteristic in FIG. 16 can be provided by optimizing the damping coefficient.

Figure 12:
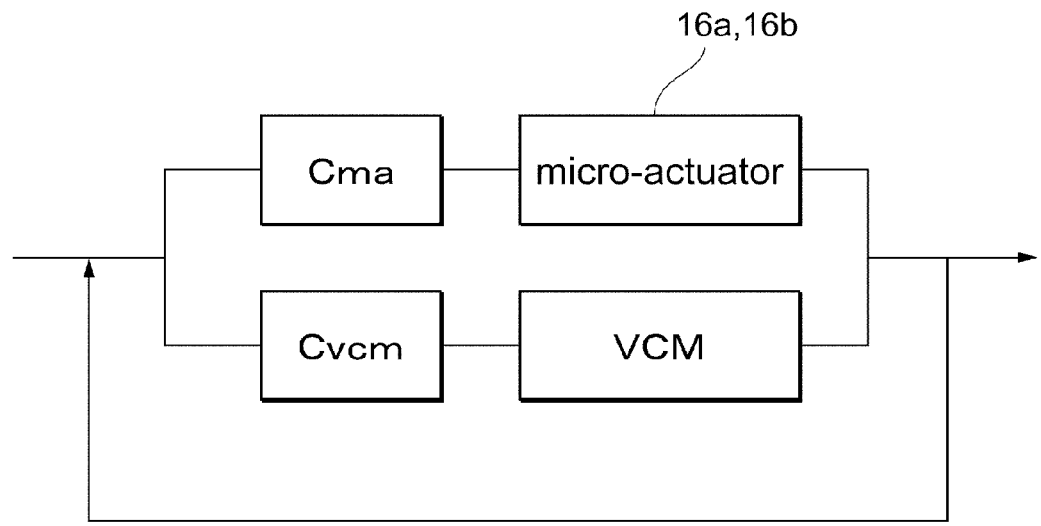
FIG. 12 is a block diagram showing the logic for controlling the location of the head.

With FIG. 12 and FIG. 13, the optimization of the damping coefficient will be described. FIG. 12 is a view showing the control module where servo controllers of the first drive unit and the second drive unit are utilized. The micro actuator composed of first drive unit 16a and second drive unit 16b is connected to VCM in parallel, and the location amount of head is the sum of the output from the micro actuator and the output from VCM. Gain Cma of the controller for the micro actuator and grain Cvcm of the controller for VCM are connected in parallel. The controlling stability of the system can be figured out using the open loop transfer function.

Open loop transfer function G is represented by the following equation (8).

[Equation 8]

$$G = C_{ma} \cdot G_{ma} + C_{vcm} \cdot G_{VCM} \quad (8)$$

Figure 13A:
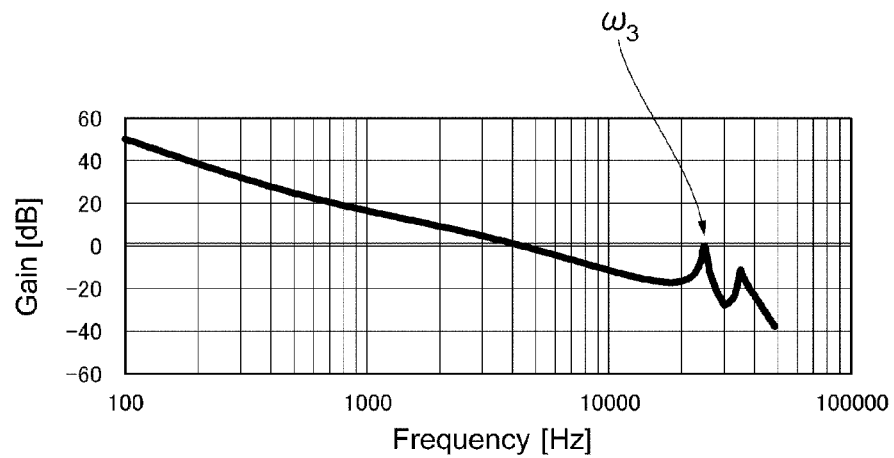
FIG. 13a is a diagram showing the property of the board when there is no gain margin in the property of head location.
Figure 13B:
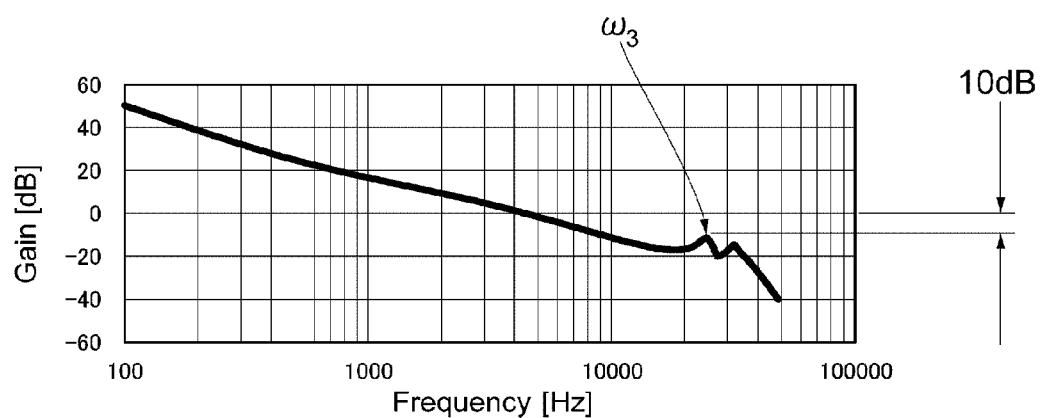
FIG. 13b is a diagram showing the property of the board when the gain margin is 10 dB in the property of head location.
Figure 13C:
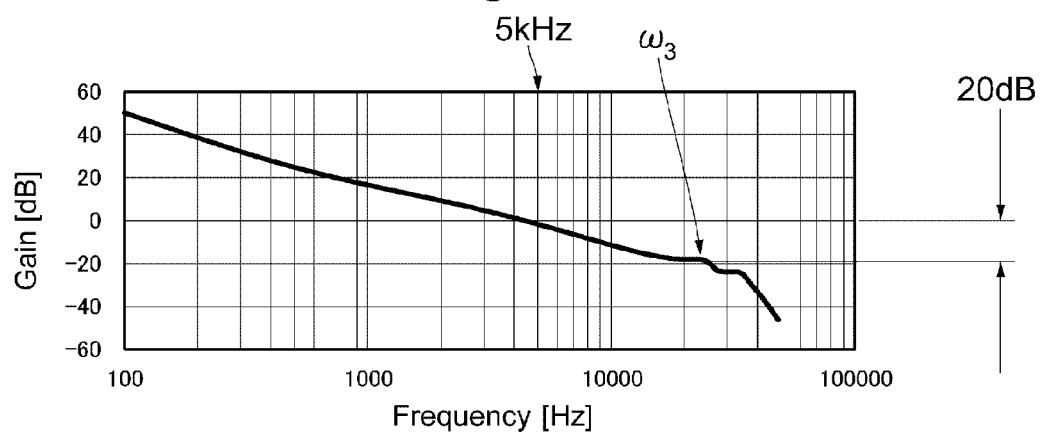
FIG. 13c is a diagram showing the property of the board when the gain margin is 20 dB in the property of head location.

Here, Gma represents the transfer function for the head supporting mechanism, and Gvcm represents the transfer function for VCM. Bode diagram of open loop transfer function is shown in FIG. 13. In this case, in the control band of 5 kHz, the grain is 0 dB. FIG. 13a shows the case where the damping part in the dynamic vibration absorber is not good enough. At this time, as the peak value is 0 dB for the first resonance point of dynamic vibration absorber 33, there is a problem in terms of controlling stability. FIG. 13b shows the case where the gain marging is 10 dB, and FIG. 13c shows the case where the gain marging is 20 dB. Generally speaking, it is necessary to keep a gain margin of 10 dB. In addition, in the case as shown in FIG. 13c, the control band can be set at 10 kHz.

Then, the underlying mechanism will be described on how dynamic vibration absorber 33 suppresses the occurrence of Sway mode in load beam 14. FIG. 11b is a view showing the operation of the first and second weight parts in dynamic vibration absorber when the drive unit is operated at a frequency range lower than the first resonance frequency of the dynamic vibration absorber (ω3). FIG. 11c is a view showing the operation of the first and second weight parts in dynamic vibration absorber when the drive unit is operated at a frequency range higher than the first resonance frequency of the dynamic vibration absorber (ω3). In FIG. 11b, when slider 3 rotates in the counterclockwise direction, first and second weight parts 33a and 33e vibrate in large amplitude in the counterclockwise direction with support projection 21 as the center. In contrast, in FIG. 11c, when slider 3 rotates in the counterclockwise direction, first and second weight parts 33a and 33e vibrate in large amplitude in the clockwise direction with support projection 21 as the center. As such, the operation mode of dynamic vibration absorber 33 changes with first resonance frequency ω3 as the boundary. Here, first resonance frequency ω3 of dynamic vibration absorber 33 is higher than that of load beam 14 in resonance of Sway mode. Further, the mode to suppress ω0 at 30 kHz was the same as that in FIG. 11c.

Figure 11D:
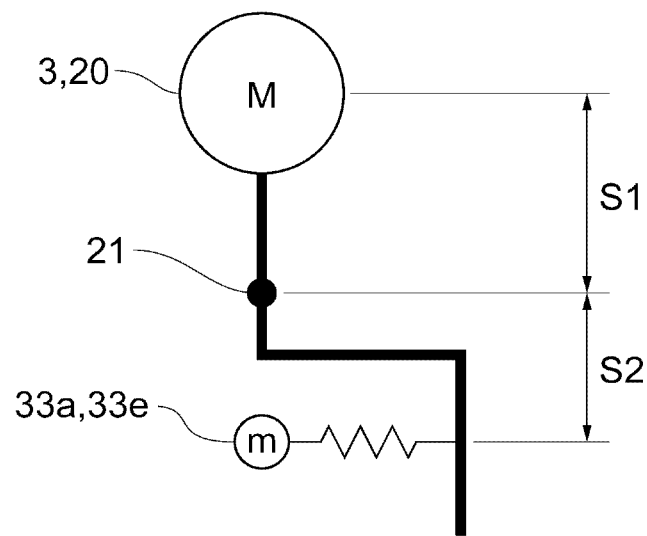
FIG. 11d is a model view showing an example of the present invention where the slider, the slider supporting plate and the dynamic vibration absorber are further simplified.
Figure 11E:
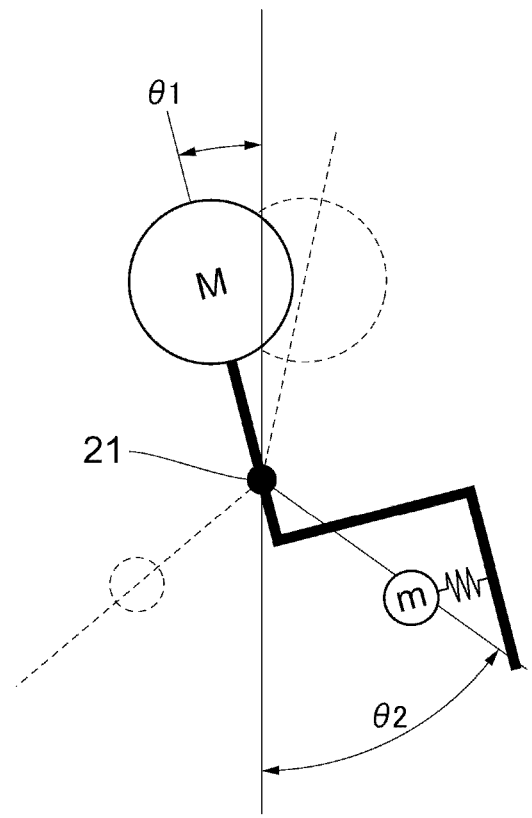
FIG. 11e is a view showing the operation status of the model in an example of the present invention where the slider, the slider supporting plate and the dynamic vibration absorber are further simplified.

FIG. 11d is a model view where the slider, the slider supporting part and the dynamic vibration absorber as shown in FIG. 11a are further simplified. FIG. 11e is a model view where the operation state as shown in FIG. 11b is simplified. In FIG. 11e, mass M of slider 3 and slide supporting plate 20 (hereinafter referred to as "mass M") rotates around support projection 21 with a rotation amount θ1, and mass m of first weight part 33a (second weight part 33e) of dynamic vibration absorber 33 (hereinafter referred to as "mass m") moves around support projection 21 with a rotation amount θ2, and dynamic vibration absorber 33 is disposed in a position with a distance S2 from support projection 21. The frequency of load beam 14 in Sway mode is one lower than first resonance frequency ω3. Thus, rotation amount θ1 of mass M and rotation amount θ2 of mass m have the same vibration cycle in the reciprocal movement, and the lag of phase is little. Further, if the vibration amplitudes (rotation amounts) θ1 and θ2 are compared with each other, vibration amplitude θ2 of first weight part 33a (second weight part 33e) in dynamic vibration absorber 33 is larger than vibration amplitude θ1 of slider 3. That is, θ1<θ2. Since mass M and mass m have the same vibration cycle, the angular velocity of first weight part 33a (second weight part 33e) in dynamic vibration absorber 33 (hereinafter referred to as "angular velocity of dynamic vibration absorber 33") increases to a large extent. In other words, the angular velocity of vibration amplitude (rotation amount) θ1 and that of vibration amplitude θ2 have the relationship as shown in the following equation (9).

[Equation 9]

$$\dot{\theta}_1 < \dot{\theta}_2 \quad (9)$$

If the movement amount of mass M is equal to that of mass m, the reaction force will not act on support projection 21. In this respect, if the velocity of mss M is defined as $V_1$ and that of mass m is defined as $V_2$, the reaction force does not act on the support projection as long as $V_1$ and $V_2$ satisfy the following equation (10).

[Equation 10]

$$M \times V_1 = m \times V_2 \quad (10)$$

In addition, in the present example, as the vibration amplitude (rotation amount) of mass M is defined as θ1, the velocity $V_1$ of mass M is angular velocity of vibration amplitude θ1×distance $S_1$ and the velocity $V_2$ of mass m is angular velocity of vibration amplitude θ2×distance $S_2$, wherein mass M represents slider 3 and slider supporting plate 20. In this way, equation (10) can be represented by the following equation (11).

[Equation 11]

$$M \times \dot{\theta}_1 \times S_1 = m \times \dot{\theta}_2 \times S_2 \quad (11)$$

When the movement amount of mass m is equal to that of mass M, it is indicated in equation (11) that mass m, the angular velocity of vibration amplitude θ2 in dynamic vibration absorber 33 and distance $S_2$ can be freely set. That is, even if mass m is small, the angular velocity of vibration amplitude θ2 or distance $S_2$ can be increased. In the frequency response characteristic as shown in FIG. 17, Sway mode of load beam 14 occurs at 25 kHz, and the first resonance frequency (ω3) of dynamic vibration absorber 33 is 27.5 kHz. As such, when the first resonance frequency (ω3) of dynamic vibration absorber 33 is set to be slightly higher than that of load beam in Sway mode and further balance the movement amount of mass M and the movement amount of mass m, the dynamic gravity center of slider 3 and slide supporting plate 20 can match support projection 21. In other words, the reaction force from the rotation of slider 3 is not transferred to load beam 14. In this way, Sway mode can be suppressed in load beam 14. That is, the weight part has the first resonance point (ω3) at which the weight part resonates by the vibration in the same direction as the direction in which head element 7 of slider 3 rotates relative to support projection 21. The first resonance point (ω3) is a frequency higher than the resonance frequency of the load beam in Sway mode. As such, the resonance of load beam in Sway mode can be suppressed. Further, if the setting of resonance frequency of dynamic vibration absorber 33 is further changed in such manner that the first resonance frequency (ω3) becomes closer to the frequency in Sway mode, the vibration amplitude of mass m increases and the angular velocity of dynamic vibration absorber 33 also increases sharply. Thus, mass m can be decreased so that the rotating part containing slider 3 and slider supporting plate 20 can be lighter.

As described above, according to the present example, when dynamic vibration absorber 33 is disposed instead of counter balance, Yaw mode can be suppressed in slider 3. Also, Sway mode can be suppressed in load beam 14, and the control band can be extended to a large extent. Further, mass m of first weight part 33a (second weight part 33e) in dynamic vibration absorber 33 becomes lighter, and the crash between the head and the disk can be further decreased when slider 3 floats above the disk. Therefore, stable floating property of slider 3 can be provided.

DESCRIPTION OF REFERENCE NUMERALS 1 magnetic disk device
2 head assembly
3 slider
4 housing
5 axis of spindle motor
6 magnetic disk
7 head element
8 supporting arm
9 horizontal rotating axis of VCM 10 magnet part
11 ramp mechanism
12 tab
13 base plate
14 load beam
15 flexure
16a first drive unit (thin film piezoelectric element)
16b second drive unit (thin film piezoelectric element)
17a/17b beam welding point
18 blade spring
19 bending processing part
20 slider supporting plate
21 support projection
22a first outrigger
22b second outrigger
23a first piezoelectric supporting part
23b second piezoelectric supporting part
24 flexure board
24a first fixing part
24b second fixing part
25 head element wiring
26 thin film piezoelectric
27a upper electrode
27b lower electrode
28 base
29a first electrode pad
29b second electrode pad
29c third electrode pad
29d fourth electrode pad
30 insulating cover
31 head electrode terminal
32a first bending part
32b second bending part
33 dynamic vibration absorber
33a first weight part of dynamic vibration absorber
33b spring part of dynamic vibration absorber
33c damping part of dynamic vibration absorber
33d frame part of dynamic vibration absorber
33e second weight part of dynamic vibration absorber
33f solder ball
34 T shaped limiter part
34a bending part
35 hole part of load beam
36a first driving rib
36b second driving rib
37a driving wiring
37b ground wiring
39a first link
39b second link
40a first joint
40b second joint
40c third joint
40d fourth joint
41 insulating layer
42 wiring cover layer
43a,43b strengthening plate
44a first separation groove
44b second separation groove
50 main weight part
51 main spring part
52 main damping part
53 auxiliary weight part
54 auxiliary spring part
55 auxiliary damping part
56 base plane
60 counter balance

What is claimed is:

1. A head assembly comprising:
   a slider having a head element;
   a slider supporting plate for holding the slider;
   a load beam for holding the slider supporting plate;
   a support projection which is arranged on the front end part of the load beam and on which the slider supporting plate is supported rotatably;
   a drive unit that rotates the slider supporting plate around the support projection in a rotating direction;
   a dynamic vibration absorber arranged on the slider supporting plate, wherein the dynamic vibration absorber is disposed closer to the rear end side of the load beam than the support projection, the dynamic vibration absorber comprises a weight part, a spring part for connecting the weight part to the slider supporting plate, and a damping part for eliminating the vibration amplitude of the weight part relative to the slider supporting plate and further comprising a frame part for supporting the spring part and the damping part, the spring part having a part which extends in a direction from the front end towards the rear end of the load beam, wherein the dynamic vibration absorber is capable of vibrating both in the rotating direction and in an opposite direction of the rotating direction relative to the slider supporting plate.

2. The head assembly according to claim 1, wherein, the weight part has a first resonance point at which the weight part resonates by the vibration in the same direction as the direction in which the head element of the slider rotates relative to the support projection, the first resonance point is a frequency higher than the resonance frequency of the load beam in sway mode.

3. The head assembly according to claim 2, further comprising a flexure that is fixed to the load beam, wherein, the weight part, the spring part and the damping part are arranged by etching a lamination material for the flexure.

4. The head assembly according to claim 3, wherein, the weight part comprises a mass adjustment part.

5. A magnetic disk device comprising the head assembly according to claim 4.

6. A magnetic disk device comprising the head assembly according to claim 3.

7. The head assembly according to claim 2, wherein, the weight part comprises a mass adjustment part.

8. A magnetic disk device comprising the head assembly according to claim 7.

9. A magnetic disk device comprising the head assembly according to claim 2.

10. The head assembly according to claim 1, further comprising a flexure that is fixed to the load beam, wherein, the weight part, the spring part and the damping part are arranged by etching a lamination material for the flexure.

11. The head assembly according to claim 10, wherein, the weight part comprises a mass adjustment part.

12. A magnetic disk device comprising the head assembly according to claim 11.

13. A magnetic disk device comprising the head assembly according to claim 10.

14. The head assembly according to claim 1, wherein, the weight part comprises a mass adjustment part.

15. A magnetic disk device comprising the head assembly according to claim 14.

16. A magnetic disk device comprising the head assembly according to claim 1.

17. A magnetic disk device comprising the head assembly according to claim 1.

* * * * *